United States Patent [19]

Masuzawa et al.

[11] 4,298,865

[45] Nov. 3, 1981

[54] DISPLAY DEVICE FOR ELECTRONIC CALCULATOR OR THE LIKE

[75] Inventors: Sigeaki Masuzawa, Nara; Mituhiro Saiji, Kyoto; Akira Tanimoto, Kashihara, all of Japan

[73] Assignee: Sharp Kabushiki Kaisha, Osaka, Japan

[21] Appl. No.: 58,666

[22] Filed: Jul. 18, 1979

[30] Foreign Application Priority Data

Jul. 26, 1978 [JP] Japan .................................. 53-91686

[51] Int. Cl.³ .............................................. G06F 3/14
[52] U.S. Cl. .................................. 340/706; 340/792; 364/710
[58] Field of Search ................. 340/792, 706; 364/710

[56] References Cited

U.S. PATENT DOCUMENTS

| | | | |
|---|---|---|---|
| 3,432,846 | 3/1969 | Jones et al. | 340/792 X |
| 3,976,975 | 8/1976 | Cochran | 364/710 X |
| 3,976,995 | 8/1976 | Sebestyen | 340/792 X |
| 3,979,058 | 9/1976 | Katz et al. | 364/710 X |
| 4,024,531 | 5/1977 | Ashby | 340/792 X |
| 4,177,518 | 12/1979 | Olander et al. | 364/710 |

*Primary Examiner*—David L. Trafton
*Attorney, Agent, or Firm*—Birch, Stewart, Kolasch & Birch

[57] ABSTRACT

A display device disclosed herein includes a dot matrix type liquid crystal display panel capable of displaying not only digits but characters in the form of a matrix. Digit of character information is stored within a memory forming part of a CPU and shifted digit by digit or character by character while the display device is in operation. In other words, the digits or characters are shifting or running at each given length of time. The present device makes it possible of displaying numerals, characters, symbols and the like of a length more than the capacity of the display panel.

18 Claims, 10 Drawing Figures

DISPLAY DEVICE FOR ELECTRONIC CALCULATOR OR THE LIKE

BACKGROUND OF THE INVENTION

This invention relates to a display device for use in an electronic apparatus such as an electronic calculator, and more particularly a new and effective display device for displaying data derived from an electronic calculator.

In the past, when it was desired to display data having a length more than the capacity of a display panel in an electronic calculator, the data to be displayed would be split into two or more groups in advance. Nevertheless, the connection between the groups was often indefinite and vague, leading to operator errors in recognizing the overall or combined contents being displayed.

OBJECTS AND SUMMARY OF THE INVENTION

It is therefore an object of the present invention to surmount the above discussed difficulties with the prior art. It is another object of the present invention to provide a display device for use in electronic calculators or the like which is capable having displaying data of a length more than the capacity of a display panel by shifting the overall display contents such as numerals, characters and symbols at every passage of a given length of time. The above discussed difficulties are overcome by constantly moving the display contents without switching the display contents at the conclusion of each group, thereby enhancing legibility of the display contents.

One of the features of the present invention lies in that the display contents are shifted and circulated in such a manner that the beginning of the display contents are again displayed after the overall display contents have gone from the edge of the display panel. In other words, the beginning of the display contents is not displayed unless the overall contents disappear from the edge of the panel. The display device according to the present invention provides an easy to read display with a definite delimitation.

Another feature of the present invention is that the displaying operation is accomplished in either a conventional mode (namely, the static mode) or a shift mode, depending upon what kind of data is to be displayed. Fr example, data such as operation results are displayed in the conventional mode (the static mode), whereas instructions as to the order of arithmetic operations are displayed in the shift mode and thus the instructions being displayed are moved at every passage of the given length of time. Even though the same contents are displayed on the panel, it becomes possible to identify the significance (or the type) of the contents by the displaying condition. This feature of the present invention is very instrumental to multiple function calculators.

As still another advantageous feature, the prevent invention provides a display device for an electronic calculator with various facilities: displaying in a similar manner to talking-news on buildings data to be next introduced when the calculator is in a halt condition on the way of executing program calculations (that is, a particular calculation comes to a halt until data are entered at a step of entering data from outside of the calculator on the way of executing the calculation); modifying characters (symbols) at a particular region of the overall display contents according to the internal operating state of the calculator; and also displaying calculation results for a given length of time immediately before the display state is commenced.

BRIEF DESCRIPTION OF THE DRAWINGS

For a more complete understanding of the present invention and for further objects and advantages thereof, reference is now made to the following description taken in conjunction with the accompanying drawings, in which.

DETAILED DESCRIPTION OF THE PREFERRED EMBODIMENTS

Figure 1:
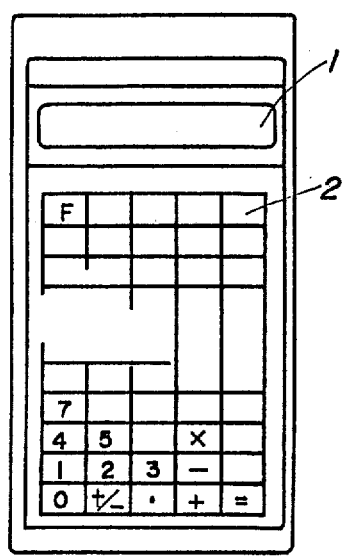
FIG. 1 is a plan view of an example of a programmable calculator embodying a display device according to the present invention.
Figure 2:
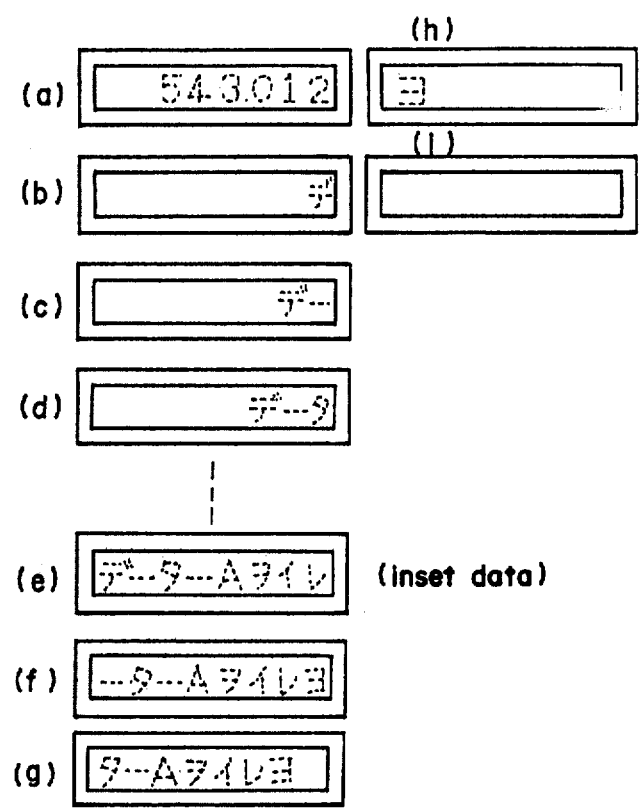
FIG. 2 is an explanatory diagram of the progress of the displaying state of the calculator.

In FIGS. 1 and 2, there are illustrated a plan view of a programmable calculator according to one preferred embodiment of the present invention and a representation showing the progress of the display state of the calculator.

In FIG. 1, a display device, for example, a dot matrix type alphanumerical liquid crystal display panel is labeled 1 and a keyboard unit is labeled 2. FIGS. 2(a)–2(i) show events over the progress of the display state when a calculator such as a function calculator reaches a halt condition during the progress of calculations to instruct the operator to introduce input data to be next introduced. FIG. 2(a) depicts a normal display mode whereas FIGS. 2(b)–2(g) depict a shifting or running display at respective points in time according to the present invention. In FIG. 2(a), there is displayed the leading character of an instruction indicative of introduction of input data to be next entered. This is followed by the display state (c) after the passage of a given length of time (say, 0.5 sec), the display state (d) after the passage of further 0.5 sec and so forth. In this way, the display contents are shifted in the sequence of (b)→(c)→(d) . . . (e)→(f)→ . . . (g)→(h)→(i) at every given length of time. After the overall display contents have gone, the display panel is restored to the initial or conventional state. The above operation sequence is then repeated.

Figure 3:
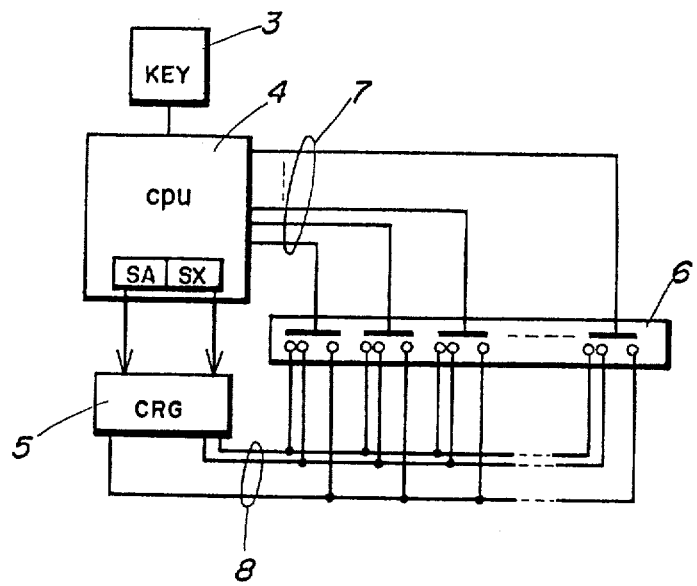
FIG. 3 is a schematic block diagram showing the essence of the calculator.

FIG. 3 is a block diagram of one embodiment of a calculator equipped with the display device according to the present invention. The embodiment shown in FIG. 3 contains a key input unit 3, a central processor unit 4 (hereinafter referred to as "CPU") described below for decoding and executing instructions, a character generator CRG 5 for decoding output signals from registeres SA and SX, a dot matrix type liquid display panel 6 of for example an eight digit capacity each digit in a 5×7 matrix, digit select signal leads 7 and segment select signal leads 8.

Figure 5:
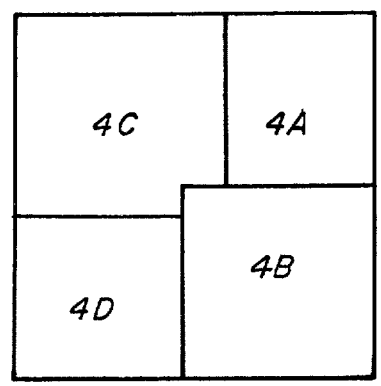
FIG. 5 is a composite schematic diagram of the CPU in the calculator.

FIG. 4, a composite diagram of FIGS. 4A–4D, shows a logic wiring diagram of a specific example of the CPU scheme in the calculator whereby the display operation of the present invention is effected. FIG. 5 shows how to combine FIGS. 4A–4D concerning the CPU. The following will set forth a logic structure of the CPU.

[CPU ARCHITECTURE]

A random access memory RAM has a 4 bit input and output capacity and is accessible by a specific digit position thereof as identified by a digit address and a file address. The RAM includes a digit address counter BL, a digit address decoder $DC_1$, a file address counter BM, a file address decoder $DC_2$ and an adder $AD_1$ which serves as an adder and a subtractor respectively in the absence and presence of a control instruction ⑭. It further includes a second adder $AD_2$ and a gate $G_1$ for providing either a digit "1" or an operand $I_A$ to an input to the adder/subtractor $AD_1$ and delivering I or $I_A$ when a control instruction ⑮ or ⑯ is developed, respectively. An input gate $G_2$ is provided for the memory digit address counter BL, which enables the output of the adder/subtractor $AD_1$, the operand $I_A$ and another operand $I_B$ to pass therethrough respectively when control instructions ⑩, ⑪ and ⑫ are developed. A gate $G_3$ is disposed to provide a digit "1" or the operand $I_A$ to an input to the adder/subtractor, the former being provided upon the development of an instruction ⑤ and the latter upon the development of an instruction ⑥. A gate $G_4$ is an input gate to the memory file address BM which enables the output of the adder $AD_2$, the operand $I_A$ and the contents of an accumulator ACC to pass upon the development of instructions ⑦, ⑧ and ⑨. A file selection gate $G_5$ is further provided for the memory RAM. A decoder $DC_3$ translates the operand $I_A$ and supplies a gate $G_6$ with a desired bit specifying signal. The gate $G_6$ contains a circuit arrangement for introducing a binary code "1" into a specific bit position of the memory identified by the operand decoder $DC_3$ and a binary code "D" into a specific bit position identified by $DC_3$, respectively, when a control instruction ② or ③ is developed. Upon the development of an instruction ④ the contents of the accumulator ACC are read out.

A read only memory ROM has its associated program counter PL which specifies a desired step in the read only memory ROM. The read only memory ROM further contains a step access decoder $DC_4$ and an output gate $G_7$ which shuts off transmission of the output of the ROM to an instruction decoder $DC_5$ when a judge flip flop F/F J is set. The instruction decoder $DC_5$ is adapted to decode instruction codes derived from the ROM and divide them into an operation code area $I_O$ and operand areas $I_A$ and $I_B$, the operation code being decoded into any control instruction ① - ㊶. The decoder $DC_5$ is further adapted to output the operand $I_A$ or $I_B$ as it is when sensing an operation code accompanied by an operand. An adder $AD_3$ increments the contents of the program counter PL. An input gate $G_8$ associated with the program counter PL provides the operand $I_A$ and transmits the contents of a program stack register SP when the instructions ⑳ and ㉑ are developed, respectively. When the instructions ⑳, ㉑ and ㊿ are being processed, any output of the adder $AD_3$ is not transmitted. Otherwise the $AD_3$ output is transmitted to automatically load "1" into the contents of the program counter PL. A flag flip flop FC has an input gate $G_9$ therefor which introduces binary codes "1" and "0" into the flag flip flop FC when the instructions ⑰ and ⑱ are developed, respectively. A key signal generating gate $G_{10}$ provides the output of the memory digit address decoder $DC_1$ without any change when the flag F/F FC is in the reset state (0), and renders all outputs $I_1$-$I_n$ "1" whatever output $DC_1$ provides when FC is in the set state (1). The accumulator ACC is 4 bits long and a temporary register X is also 4 bits long. An input gate $G_{11}$ for the temporary register X transmits the contents of the accumulator ACC and the stack register SX respectively upon the development of the instructions ㉙ and ㊾. An adder $AD_4$ executes a binary addition on the contents of the accumulator ACC and other data. The output $C_4$ of the adder $AD_4$ assumes "1" when the fourth bit binary addition yields a carry. A carry F/F C has its associated input gate $G_{12}$ which sets "1" into the carry F/F C in the presence of "1" of the fourth bit carry $C_4$ and "0" into the same in the absence of $C_4(0)$. "1" and "0" are set into C upon the development of ㉑ and ㉒, respectively. A carry (C) input gate $G_{18}$ enables the adder $AD_4$ to perform binary additions with a carry and thus transmits the output of the carry F/F C into the adder $AD_4$ in response to the instruction ㉕. An input gate $G_{14}$ is provided for the adder $AD_4$ and transfers the output of the memory RAM and the operand $I_A$ upon the development of ㉓ and ㉔, respectively. An output buffer register F has a 4 bit capacity and an input gate which enables the contents of the accumulator ACC to enter into F upon the development of ㉛. An output decoder SD decodes the contents of the output buffer F into display segment signals $SS_1$-$SS_n$. An output buffer register W has a shift circuit SHC which shifts the overall bit contents of the output buffer register W one bit to the right at a time in response to ㉜ or ㉝. An input gate $G_{16}$ for the output buffer register W provides "1" and "0" to the first bit position of W upon ㉜ and ㉝, respectively. Immediately before 37 1" or or "0" enters into the first bit position of W the output buffer shift circuit SHC becomes operative.

An output control flag F/F $N_p$ has an input gate $G_{17}$ for receiving "1" and "0" upon the development of ㉞ and ㉟, respectively.

The buffer register W is provided with an output control gate $G_{18}$ for providing the respective bit outputs thereof at one time only when the flag F/F $N_p$ is in the set state (1). There are further provided a judge F/F J, inverters $IV_1$-$IV_4$ and an input gate $G_{19}$ for the judge F/F J for transferring the state of an input $KN_1$ into J upon the development of ㊱. In the case where $KN_1=0$, $J=1$ because of intervention of the inverter $IV_1$. An input gate $G_{20}$ for the judge F/F J is adapted to transfer the state of an input $KN_2$ into J upon ㊳. When $KF_1=0$, $J=1$ because of intervention of the inverter $IV_3$. An input Gate $G_{22}$ for the judge F/F J is adapted to transfer the state of the input $KF_2$ into J upon ㊴. When $KF_2=0$, $J=1$ because of the intervened inverter $IV_4$. An input gate $G_{23}$ is provided for the judge flip flop J for transmission of the state of an input AK into J upon the development of ㊵. When $AK=1$, $J=1$. An input gate $G_{24}$ is provided for the judge flip flop J to transmit the state of an input TAB into J pursuant to ㊶. When $TAB=1$, $J=1$. A gate $G_{25}$ is provided for setting the judge F/FJ upon the development of ㊷. A comparator $V_1$ compares the contents of the memory digit address counter BL with preselected data and provides an output "1" if there is agreement. The comparator $V_1$ becomes operative when ㊸ or ㊹ is developed. The data to be compared are derived from a gate $G_{26}$ which is an input gate to the comparator $V_1$. The data $n_1$ to be compared are a specific higher address value which is often available in controlling the RAM. $n_1$ and $n_2$ are provided for comparison purposes upon the development of ㊸ and ㊹, respectively.

An input gate $G_{27}$ is provided for the decision F/F J to enter "1" into J when the carry F/F C assumes "1" upon the development of ㊺.

A decoder $DC_6$ decodes the operand $I_4$ and helps decisions as to whether or not the contents of a desired bit position of the RAM are "1". A gate $G_{28}$ transfers the contents of the RAM as specified by the operand decoder $DC_6$ into the judge F/F when ㊻ is derived. When the specified bit position of the RAM assumes "1", J=1. A comparator $V_2$ decides whether or not the contents of the accumulator ACC are equal to the operand $I_4$ and provides an output "1" when the affirmative answer is provided. The comparator $V_2$ becomes operative according to ㊼. A comparator $V_3$ decides under ㊽ whether the contents of the memory digit address counter BL are equal to the operand $I_4$ and provides an output "1" when the affirmative answer is obtained. A comparator $V_4$ decides whether the contents of the accumulator ACC agree with the contents of the RAM and provides an output "1" in the presence of the agreement. A gate $G_{29}$ transfers the fourth bit carry $C_4$ occurring during additions into the judge F/F J. Upon the development of ㊾ $C_4$ is sent to F/F J. J=1 in the presence of $C_4$. A flag flip flop FA has an input gate $G_{31}$ which provides outputs "1" and "0" upon the development of ㊿ and ㊾, respectively. An input gate $G_{32}$ is provided for setting the judge F/F J when the flag flip flop FA assumes "1". A flag flip flop $F_B$ also has an input gate $G_{33}$ which provides outputs "1" and "0" upon ㊾ and ㊾, respectively. An input gate $G_{34}$ for the judge flip flop J is adapted to transfer the contents of the flag flip flop $F_B$ into the F/F J upon the development of ㊾. An input gate $G_{35}$ associated with the judge F/F J is provided for transmission of the contents of an input B upon ⑲. When B=1, J=1. An input gate $G_{36}$ associated with the accumulator ACC is provided for transferring the output of the adder $AD_4$ upon ㉖ and transferring the contents of the accumulator ACC after inverted via an inverter $IV_5$ upon ㉗. The contents of the memory RAM are transferred upon ㉘, the operand $I_4$ upon ⑬, the 4 bit input contents $k_1$–$k_4$ upon ㊾, and the contents of the stack register SA upon ㊾. A stack register SA provides the output outside the present system. A stack register SX also provides the output outside the system. An input gate $G_{37}$ associated with the stack register SA transfers the accumulator ACC upon ㊾. An input gate $G_{38}$ associated with the stack register SX transfers the contents of the temporary register X. A program stack register SP has an input gate $G_{39}$ for loading the contents of the program counter PL incremented by "1" through the adder into the program stack register.

An illustrative example of the instruction codes contained within the ROM of the CPU structure, the name and function of the instruction codes and the control instructions developed pursuant to the instruction codes will now be tabulated in Table 1 wherein A: the instruction codes, B: the instruction name, C: the instruction description and D: The CPU control instructions.

TABLE 1

| | A | | B | D | | | | |
|---|---|---|---|---|---|---|---|---|
| 1 | $I_0$ | | SKIP | ㊷ | | | | |
| 2 | $I_0$ | | AD | ㉓ | ㉖ | | | |
| 3 | $I_0$ | | ADC | ㉓ | ㉖ | ㉕ | ① | |
| 4 | $I_0$ | | ADCSK | ㉓ | ㉖ | ㉕ | ㊿ | ① |
| 5 | $I_0$ | $I_4$ | ADI | ㉔ | ㉖ | ㊿ | | |
| 6 | $I_0$ | $I_4$ | DC | ㉔ | ㉖ | ㊿ | | |
| 7 | $I_0$ | | SC | ㉑ | | | | |
| 8 | $I_0$ | | RC | ㉒ | | | | |
| 9 | $I_0$ | $I_4$ | SM | ② | | | | |
| 10 | $I_0$ | $I_4$ | RM | ① | | | | |
| 11 | $I_0$ | | COMA | ㉗ | | | | |
| 12 | $I_0$ | $I_4$ | LDI | ⑬ | | | | |
| 13 | $I_0$ | $I_4$ | L | ㉘ | ⑧ | | | |
| 14 | $I_0$ | $I_4$ | LI | ㉘ | ⑨ | ⑮ | ⑩ | ㊸ |
| 15 | $I_0$ | $I_4$ | XD | ㉘ | ⑧ | ⑭ | ⑩ | |
| | | | | ㊹ | | | | |
| 16 | $I_0$ | $I_4$ | X | ㉘ | ④ | ⑧ | | |
| 17 | $I_0$ | $I_4$ | XI | ㉘ | ④ | ⑧ | ⑮ | ⑩ | ㊸ |
| 18 | $I_0$ | $I_4$ | XD | ㉘ | ④ | ⑧ | ⑭ | ⑯ | ⑩ |
| | | | | ㊹ | | | | |
| 19 | $I_0$ | $I_4$ | LBLI | ⑪ | | | | |
| 20 | $I_0$ $I_4$ | $I_B$ | LB | ⑧ | ⑫ | | | |
| 21 | $I_0$ | $I_4$ | ABLI | ⑯ | ⑩ | ㊸ | | |
| 22 | $I_0$ | $I_4$ | ABMI | ⑥ | ⑦ | | | |
| 23 | $I_0$ | $I_4$ | T | ⑳ | | | | |
| 24 | $I_0$ | | SKC | ㊺ | | | | |
| 25 | $I_0$ | $I_4$ | SKM | ㊻ | | | | |
| 26 | $I_0$ | $I_4$ | SKBI | ㊽ | | | | |
| 27 | $I_0$ | $I_4$ | SKAI | ㊼ | | | | |
| 28 | $I_0$ | | SKAM | ㊾ | | | | |
| 29 | $I_0$ | | $SKN_1$ | ㊻ | | | | |
| 30 | $I_0$ | | $SKN_2$ | ㊲ | | | | |
| 31 | $I_0$ | | $SKF_1$ | ㊳ | | | | |
| 32 | $I_0$ | | $SKF_2$ | ㊴ | | | | |
| 33 | $I_0$ | | SKAK | ㊵ | | | | |
| 34 | $I_0$ | | SKTAB | ㊶ | | | | |
| 35 | $I_0$ | | SKFA | ㊹ | | | | |
| 36 | $I_0$ | | SKFB | ㊾ | | | | |
| 37 | $I_0$ | | WIS | ㉜ | | | | |
| 38 | $I_0$ | | WIR | ㉝ | | | | |
| 39 | $I_0$ | | NPS | ㉞ | | | | |
| 40 | $I_0$ | | NPR | ㉟ | | | | |
| 41 | $I_0$ | | ATF | ㊶ | | | | |
| 42 | $I_0$ | | LXA | ㉙ | | | | |
| 43 | $I_0$ | | XAX | ㉙ | ㊿ | | | |
| 44 | $I_0$ | | SFA | ㊾ | | | | |
| 45 | $I_0$ | | RFA | ㊾ | | | | |
| 46 | $I_0$ | | SFB | ㉟ | | | | |
| 47 | $I_0$ | | RFB | ㊽ | | | | |
| 48 | $I_0$ | | SFC | ⑰ | | | | |
| 49 | $I_0$ | | RFC | ⑱ | | | | |
| 50 | $I_0$ | | SKB | ⑲ | | | | |
| 51 | $I_0$ | | KTA | ㊾ | | | | |
| 52 | $I_0$ | | STPO | ㊾ | | | | |
| 53 | $I_0$ | | EXPO | ㊾ | ㊾ | | | |
| 54 | $I_0$ | $I_4$ | TML | ㊾ | ⑳ | | | |
| 55 | $I_0$ | | RIT | ㊶ | | | | |

Instruction Description (C)

(1) SKIP

Only the program counter PL is incremented without executing a next program step instruction, thus skipping a program step (2) AD A binary addition is effected on the contents of the accumulator ACC and the contents of the RAM, the addition results being loaded back into the accumulator ACC.

(3) ADC

A binary addition is effected on the contents of the accumulator ACC, the memory RAM and the carry F/F C, the results being loaded back to the accumulator ACC.

(4) ADCSK

A binary addition is effected on the contents of the accumulator ACC, the memory RAM and the carry flip flop C, the results being loaded into the accumulator ACC. If the fourth bit carry $C_4$ occurs in the results, then a next program step is skipped.

(5) ADI

A binary addition is achieved upon the contents of the accumulator ACC and the operand $I_4$ and the results are loaded into the accumulator ACC. If the fourth bit carry $C_4$ is developed in the addition results, then a next program step is skipped.

(6) DC

The operand $I_4$ is fixed as "1010" (a decimal number "10") and a binary addition is effected on the contents of the accumulator ACC and the operand $I_4$ in the same way as in the ADI instruction. The decimal number 10 is added to the contents of the accumulator ACC, the results of the addition being loaded into ACC.

(7) SC

The carry F/F C is set ("1" enters into C).

(8) RC

The carry F/F C is reset ("0" enters into C).

(9) SM

The contents of the operand $I_4$ are decoded to give access to a desired bit position of the memroy specified by the operand ("1" enters).

(10) RM

The contents of the operand $I_4$ are interpreted to reset a desired bit position of the memory specified by the operand ("0" enters).

(11) COMA

The respective bits of the accumulator ACC are inverted and the resulting complement to "15" is introduced into ACC.

(12) LDI

The operand $I_4$ enters into the accumulator ACC.

(13) L

The contents of the memory RAM are sent to the accumulator ACC and the operand $I_4$ to the file address counter BM.

(14) LI

The contents of the memory RAM are sent to the accumulator ACC and the operand $I_4$ to the memory file address counter BM. At this time the memory digit address counter BL is incremented. If the contents of BL agree with the preselected value $n_1$, then a next program step is skipped.

(15) XD

The contents of the memory RAM are exchanged with the contents of ACC and the operand $I_4$ is sent to the memory file address counter BM. The memory digit address counter BL is decremented. In the event that the contents of BL agree with the preselected value $n_2$, then a next program step is skipped.

(16) X

The contents of the memory RAM are exchanged with the contents of the accumulator ACC and the operand $I_4$ is loaded into the memory file address counter BM.

(17) XI

The contents of the memory RAM are exchanged with the contents of the accumulator ACC and the operand $I_4$ is sent to the memory file address counter BM. The memory digit address counter BL is incremented. In the event that BL is equal to the preselected value $n_1$, a next program step is skipped.

(18) XD

The contents of the memory RAM replaces the contents of the accumulator ACC, the operand $I_4$ being sent to the memory file address counter BM. The memory digit address counter BL at this time is incremented. If the contents of BL are equal to $n_2$, then a next program step is skipped.

(19) LBLI

The operand $I_4$ is loaded into the memory digit address counter BL.

(20) LB

The operand $I_4$ is loaded into the memory file address counter BM and the operand B to the memory digit address counter BL.

(21) ABLI

The operand $I_4$ is added to the contents of the memory digit address counter BL in a binary addition fashion, the results being loaded back to BL. If the contents of BL are equal to $n_1$, then no next program step is carried out.

(22) ABMI

The operand $I_4$ is added to the contents of the memory file address counter BM in a binary fashion, the results being into BM.

(23) T

The operand $I_4$ is loaded into the program step counter PL.

(24) SKC

If the carry flip flop C is "1", then no next program step is taken.

(25) SKM

The contents of the operand $I_4$ are decoded and a next program step is skipped as long as a specific bit position of the memory specified by the operand $I_4$ assumes "1".

(26) SKBI

The contents of the memory digit address counter BL are compared with the operand $I_4$ and a next succeeding program step is skipped when there is agreement.

(27) SKAI

The contens of the accumulator ACC are compared with the operand $I_4$ and if both are equal to each other a next program step is skipped.

(28) SKAM

The contents of the accumulator ACC are compared with the contents of the RAM and if both are equal a next program step is skipped.

(29) $SKN_1$

When the input $KN_1$ is "0", a next program step is skipped.

(30) $SKN_2$

When the input $KN_2$ is "0", a next program step is skipped.

(31) $SKF_1$

When the input $KF_1$ is "0", a next program step is skipped.

(32) $SKF_2$

When the input $KF_2$ is "0", a next program step is skipped.

(33) SKAK

When the input AK is "1", a next program step is skipped.

(34) SKTAB

When the input TAB is "1", a next program step is skipped.

(35) SKFA

When the flag flip flop F/A assumes "1" a next program step is skipped.

(36) SKFB

When the flag flip flop $F_B$ assumes "1", a next program step is skipped.

(37) WIS

The contents of the output buffer register W are one bit right shifted, the first bit position (the most significant bit position) receiving "1".

(38) WIR

The contents of the output buffer register W are one bit right shifted, the first bit position (the most significant bit position being loaded with "0".

(39) NPS

The output control F/F $N_p$ for the buffer register W is set ("1" enters).

(40) NPR

The buffer register output control flip flop $N_p$ is reset ("0" enters therein).

(41) ATF

The contents of the accumulator ACC are transferred into the output buffer register F.

(42) LXA

The contents of the accumulator ACC are unloaded into the temporary register X.

(43) XAX

The contents of the accumulator ACC are exchanged with the contents of the temporary register X.

(44) SFA

The flag F/F FA is set (an input of "1").

(45) RFA

The flag F/F FA is reset (an input of "0").

(46) SFB

The flag flip flop $F_B$ is set (an input of "1").

(47) RFB

The flag flip flop $F_B$ is reset (an input of "0").

(48) SFC

An input testing flag F/F $F_C$ is set (an input of "1").

(49) RFC

The input testing flag F/F $F_C$ is reset (an input of "0").

(50) SKB

When an input β is "1", a next program step is skipped.

(51) KTA

The inputs $k_1$–$k_4$ are introduced into the accumulator ACC.

(52) STPO

The contents of the accumulator ACC are sent to the stack register SA and the contents of the temporary register X to the stack register SX.

(53) EXPO

The contents of the accumulator ACC are exchanged with the stack register SA and the contents of the temporary register X with the stack register SX.

(54) TML

The contents of the program counter $P_L$ incremented by one are transferred into the program stack register SP and the operand $I_A$ into the program counter $P_L$.

(55) RIT

The contents of the program stack register SP are transmitted into the program counter $P_L$.

Table 2 sets forth the relationship between the operation codes contained within the ROM of the CPU structure and the operand.

TABLE 2

```
AD    →  0 0 0 1 0 1 1 0 0 0        (I_O)
COMA  →  0 0 0 1 0 1 1 1 1 1        (I_O)
SKBI  →  0 0 0 1 1 0 0 0 1 0        (I_O)(I_A)
LB    →  0 1 0 0 1 0 1 0 1 1        (I_O)(I_A)(I_B)
                 ↓
              to G7
                 ↓
              to DC5
``` wherein $I_O$: the operation codes and
$I_A$, $I_B$: the operands

Taking an example wherein the output of the read only memory ROM is 10 bit long, the instructoin decoder DC5 decides whether the instruction AD or COMA (see Table 1) assumes "0001011000" or "0001011111" and develops the control instructions ㉓, ㉖, or ㉗. SKBI is identified by the fact that the upper six bits assume "000110", the lower 4 bits "0010" being treated as the operand $I_A$ and the remaining ninth and tenth bits "11" as the operand $I_B$. The operand forms part of instruction words and specifies data and addresses for next succeeding instructions and can be called an address area of an instruction.

Major processing operations (a processing list) of the CPU structure will now be described in sufficient detail.

[PROCESSING LIST]

(I) A same numeral N is loaded into a specific region of the memory RAM (NNN→X)

(II) A predetermined number of different numerals are loaded into a specific region of the memory ($N_1$, $N_2$, $N_3$, ... →X)

(III) The contents of a specific region of the memory are transferred into a different region of the memory (X→Y)

(IV) The contents of a specific region of the memory are exchanged with that of a different region (X⊖Y)

(V) A given numeral N is added or subtracted in a binary fashion from the contents of a specific region of the memory (X±N)

(VI) The contents of a specific region of the memory are added in a decimal fashion to the contents of a different region (X±Y)

(VII) The contents of a specific region of the memory are one digit shifted (X right, X left)

(VIII) A one bit conditional F/F associated with a specific region of the memory is set or reset (F set, F reset)

(IX) The state of the one bit conditional F/F associated with a specific region of the memory is sensed and a next succeeding program address is changed according to the results of the state detection.

(X) It is decided whether the digit contents of a specific region of the memory reach a preselected numeral and a next succeeding program step is altered according to the results of such decision.

(IX) It is decided whether the plural digit contents of a specific region of the memory are equal to a preselected numeral and a program step is altered according to the results of the decision.

(XII) It is decided whether the digit contents of a specific region of the memory are smaller than a given value and a program step to be next executed is changed according to the decision.

(XIII) It is decided whether the contents of a specific region of the memory are greater than a given value and the results of such decision alter a program step to be next executed.

(XIV) The contents of a specific region of the memory are displayed. (XV) What kind of a key switch is actuated is decided.

The above processing events in (1)–(15) above are executed according to the instruction codes step by step in the following manner.

---

(I) PROCEDURE OF LOADING A SAME VALUE N INTO A SPECIFIC REGION OF THE MEMORY (NNN→X)

(Type 1)

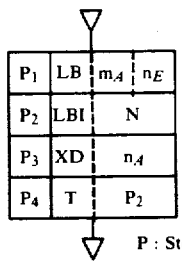

| $P_1$ | LB | $m_A$ | $n_E$ |
| $P_2$ | LBI | N | |
| $P_3$ | XD | $n_A$ | |
| $P_4$ | T | $P_2$ | |

P : Step $P_1$ ..... The first digit position of the memory to be processed is specified by a file address $m_A$ and a digit address $n_E$.
$P_2$ ..... The value N is loaded into ACC.
$P_3$ ..... The value N is loaded into the specified region of the memory by exchange between the memory and ACC. With no change in the file address of the memory, $m_A$ is specified and the digit address is decremented to determine a digit to be next introduced. By determing $n_2$ as the final digit value $n_A$ to be introduced, the next step $P_4$ is skipped to complete the processing of the Type 1 since BL = $n_2$ under the condition that the value N has been completely loaded into the specific region.
$P_4$ ..... LDI and XD are carried out repeatedly from the program address $P_2$ up to BL = V.

(Type 2)

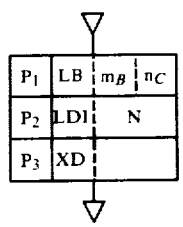

| $P_1$ | LB | $m_B$ | $n_C$ |
| $P_2$ | LDI | N | |
| $P_3$ | XD | | |

$P_1$ ..... The digit of the memory to be processed is determined by the file address $m_B$ and the digit address $n_C$.
$P_2$ ..... The ACC is loaded with the value N.
$P_3$ ..... By exchange between the memory and ACC the value N is loaded into the above specified region of the memory. This completes the processing of Type 2. An operand area of $X_D$ is necessary to the next succeeding process and not to this step.

(Type 3)

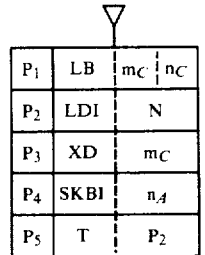

| $P_1$ | LB | $m_C$ | $n_C$ |
| $P_2$ | LDI | N | |
| $P_3$ | XD | $m_C$ | |
| $P_4$ | SKBI | $n_A$ | |
| $P_5$ | T | $P_2$ | |

$P_1$ ..... The first digit of the memory to be processed is specified by the file address $m_C$ and the digit address $n_O$.
$P_2$ ..... The ACC is loaded with the value N.
$P_3$ ..... By exchange between the memory and ACC the value N is loaded into that specified region of the memory. With no change in the file address of the memory $m_C$ is specified and the digit address is decremented in order to determine the digit to be next loaded therein.
$P_4$ ..... It is decided whether the digit processed during the step $P_3$ is the final digit $n_B$. If it is $n_B$, then the digit address is decremented to $n_A$. An operand area of the SKI instruction is occupied by $n_A$, thus loading the final digit with the value N. In reaching $P_4$, conditions are fulfilled and the next step $P_5$ is skipped, thereby terminating the type 3. If the conditions are not fulfilled, $P_5$ is then reached.
$P_5$ ..... The program address $P_2$ is specified and $P_2$–$P_4$ are repeated until BL = $n_A$.

(II) PROCEDURE OF LOADING A PREDETERMINED NUMBER OF DIFFERENT VALUES INTO A SPECIFIC REGION OF THE MEMORY ($N_1, N_2, N_3, ..... →X$)

(Type 1) For example, four digit values $N_4N_3N_2N_1$ are loaded an arbitraray digit position in the same manner as above.

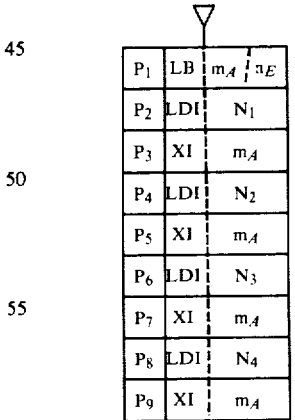

| $P_1$ | LB | $m_A$ | $n_E$ |
| $P_2$ | LDI | $N_1$ | |
| $P_3$ | XI | $m_A$ | |
| $P_4$ | LDI | $N_2$ | |
| $P_5$ | XI | $m_A$ | |
| $P_6$ | LDI | $N_3$ | |
| $P_7$ | XI | $m_A$ | |
| $P_8$ | LDI | $N_4$ | |
| $P_9$ | XI | $m_A$ | |

$P_1$ ..... The first processed digit position of the memory is specified by the file address $m_A$ and the digit address $n_E$.
$P_2$ ..... A constant $N_1$ is loaded into ACC.
$P_3$ ..... Through exchange between the memory and the ACC the value $N_1$ is loaded into the above specified region of the memory. The file address of the memory remains unchanged as $m_A$, whereas the digit -continued

|  |  | address is up for introduction of the next digit. |
|---|---|---|
| P$_4$ ..... |  | A second constant N$_2$ is loaded into ACC. |
| P$_5$ ..... |  | Since the second digit of the memory has been specified during P$_3$, the second constant N$_2$ is loaded into the second digit position of the memory through exchange between the memory and ACC. |
| P$_6$–P$_9$ .. |  | The same as in the above paragraph. |

(Type 2)

Any value of 0–15 is loaded into a predetermined register.

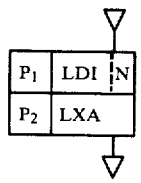

| P$_1$ ..... | The value N is loaded into ACC. |
| P$_2$ ..... | The value N is transmitted from ACC into the register X. |

(III) PROCEDURE OF TRANSFERRING THE CONTENTS OF A SPECIFIC REGION OF THE MEMORY TO A DIFFERENT REGION OF THE MEMORY (X → Y)

(Type 1)

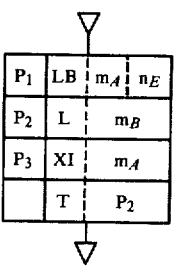

| P$_1$ ..... | The first memory file address is specified as m$_A$ and the first digit address as n$_E$. |
| P$_2$ ..... | The contents of the first digit position of the memory are loaded into ACC and its designation, the second memory file address is specified as m$_B$ prior to the transmission step P$_3$. |
| P$_3$ ..... | The first digit memory contents loaded into the ACC are replaced by the same second memory digit contents so that the first memory contents are transmitted into the second memory. In order to repeat the above process, the first memory file address m$_A$ is again set. The value of the final digit n$_A$ to be transmitted is previously selected to be n$_1$. Since BL → n$_1$ after the overall first memory contents have been sent to the second memory, the next step P$_4$ is skipped to complete the processing of Type 1. The digit address is progressively incremented until BL = V (the final digit). Through the step P$_4$ the file address is set up at m$_A$ to lead back to P$_2$, thereby specifying the first memory. |
| P$_4$ ..... | The program address is set at the step P$_2$ and the instructions P$_2$ and P$_3$ are repeatedly executed until BL = n$_1$. The transmission step is advanced digit by digit. |

(Type 2)

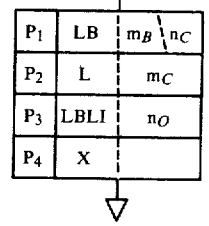

| P$_1$ ..... | The region of the memory to be processed is determined by the file address m$_A$ and the digit address n$_C$. |
| P$_2$ ..... | The contents of the memory as specified above are unloaded into ACC and the memory file address is set at m$_C$ prior to the next transmission step P$_4$. |
| P$_3$ ..... | The digit address of the memory, the destination for the transmission process, is specified as m$_C$. The destinated region of the memory is specified via the steps P$_2$ and P$_3$. |
| P$_4$ ..... | The contents of ACC are exchanged with the contents of the regions of the memory specified bu P$_2$ and P$_3$. The operand of X has no connection with the present process. |

(Type 3)

| P$_1$ | LB | m$_B$ | n$_C$ |
|---|---|---|---|
| P$_2$ | L |  |  |
| P$_3$ | LXA |  |  |

| P$_1$ ..... | The region of the memory to be processed is identified by the file address m$_A$ and the digit address n$_C$. |
| P$_2$ ..... | The contents of the memory region specified during P$_1$ are unloaded into ACC. |
| P$_3$ ..... | The contents of the memory transmitted from ACC are sent to the register X, completing the type 3 processing. |

(IV) PROCEDURE OF EXCHANGING CONTENTS BETWEEN A SPECIFIC REGION OF THE MEMORY AND A DIFFERENT REGION (X → Y)

(Type 1)

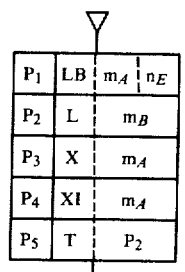

| P$_1$ ..... | The first memory file address to be processed is specified as m$_A$ and the first digit address as n$_E$. |
| P$_2$ ..... | The specific digit contents of the first memory are loaded into ACC and the second memory file address is specified as m$_B$ for preparation of the next step. |
| P$_3$ ..... | The specific digit contents of the first memory contained within ACC are exchanged with the same digit contents of the second memory specified by P$_2$. The file address of the first memory is specified |

-continued as $m_A$ in order to load the contents of the memory now in ACC into the first memory.

P₄ ..... The contents of the second memory now in ACC are exchanged with the contents of the first memory at the corresponding digit positions so that the contents of the second memory are transferred to the first memory. Exchanges are carried out during the steps P₂-P₄. The first memory is specified on by the file address $m_A$, while the digit address is incremented to select a next address. Exchange is carried out progressively digit by digit. The final digit value $n_A$ is previously set at $n_1$ such that $B_L = n_1$ after the exchange operation between the first memory and the second has been effected throughout the all digit positions, thus skipping the next step P₅ and completing the processing of Type 1.

P₅ ..... The program address P₂ is selected and the instructions for P₂ to P₄ are executed repeatedly until $B_L = n_1$. The exchange operation is advanced digit by digit.

(Type 2)

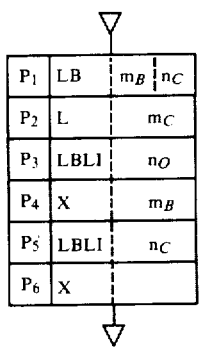

P₁ ..... The file address of the first memory to be processed is specified as $m_A$ and the digit address as $n_C$.

P₂ ..... The contents of the specific digit position of the first memory are unloaded into ACC and the file address of the second memory is specified as $m_C$ and ready to exchange.

P₃ ..... The digit address of the second memory, the destination for the exchange process, is specified as $n_O$ to determine the destinated memory address.

P₄ ..... The contents of the first memory now within ACC are exchanged with that of the second memory. At the same time the file address $m_B$ of the first memory is again specified to transfer the contents of the first memory to the first memory.

P₅ ..... The digit address $n_C$ of the first memory is specified to determine the destination address of the first memory.

P₆ ..... The contents of the second memory now within ACC are exchanged with the contents of the first memory.

(Type 3)

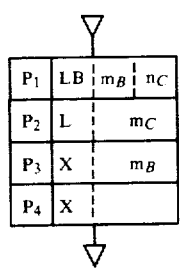

P₁ ..... The file address $m_A$ of the first memory to be processed is specified and the digit address $n_C$ is specified.

P₂ ..... The contents of the first memory are loaded into ACC and the file address $m_C$ of the second memory is selected.

P₃ ..... The exchange is carried out between the first and second memory so that the contents of the first memory are loaded into the second memory. Prior to the step P₄ the file address $m_B$ of the first memory is selected again.

P₄ ..... The exchange is effected between the contents of the second memory and the first memory.

(Type 4)

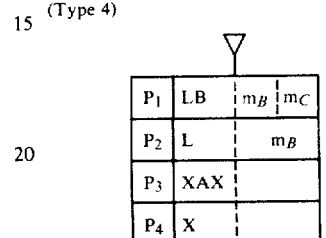

P₁ ..... The region of the memory to be processed is specified by the file address $m_A$ and the digit address $n_C$.

P₂ ..... The contents of the memory region specified in P₁ above are loaded into ACC. The file address $m_B$ is kept being selected prior to the exchange with the contents of the register X.

P₃ ..... The exchange is effected between ACC and the register X so that the contents of the memory are shifted to the register X.

P₄ ..... Through the exchange between ACC containing the contents of the register X and the memory, the contents of the register X are substantially transferred into the memory, thus accomplishing the Type 4 processing.

(V) PROCEDURE OF EFFECTING A BINARY ADDITION OR SUBTRACTION OF A GIVEN VALUE N ONTO A SPECIFIC REGION OF THE MEMORY (Type 1) $M_1 + N \rightarrow M$

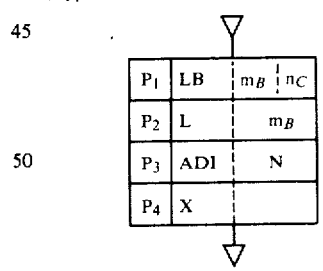

P₁ ..... The region of the memory to be processed is specified by the file address $m_B$ and the digit address $n_C$.

P₂ ..... The contents of the memory specified by the step P₁ are unloaded into ACC. The memory file address is set again at $m_B$ to specify the same memory.

P₃ ..... The operand specifies the value N to be added and the contents of the memory contained within ACC are added with the value N, the results being loaded back to ACC.

P₄ ..... The sum contained with ACC is exchanged with the contents of the memory specified by the step P₂, thus completing the Type 1 processing.

(Type 2) $X + N \rightarrow X$

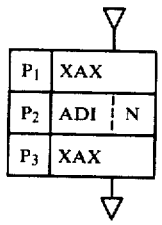

P₁ ..... The exchange is effected between the register X and ACC.
P₂ ..... The operand specifies the value N to be added and an addition is carried out on the contents of the register X now within ACC and the value N, with the results back to ACC.
P₃ ..... Through the exchange between the resulting sum within ACC and the contents of the register X, the processing of Type 2 (X + N → X) is performed.

(Type 3) $M_1 + N \rightarrow M_2$

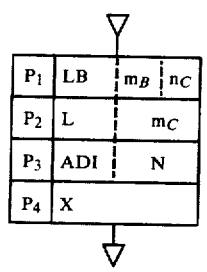

P₁ ..... The region of the first memory to be processed is decided by the file address $m_B$ and the digit address $n_C$.
P₂ ..... The contents of the memory specified by P₁ are loaded into ACC. The file address $m_C$ of the second memory is specified to return addition results to the second memory.
P₃ ..... The operand specifies the value N to be added and the value N is added to the contents of the memory now within ACC, with the results being loaded into ACC.
P₄ ..... The resulting sum within ACC is exchanged with the contents of the second memory as specified by P₂, thus completing the processing of Type 3.

(Type 4) $M_1 - N \rightarrow M_1$

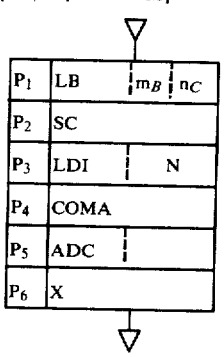

P₁ ..... There are specified the file address $m_B$ and the digit address $n_C$ of the memory to be processed.
P₂ ..... Subtraction is carried out in such a way that the complement of a subtrahend is added to a minuend and the F/F C remains set because of the absence of a borrow from a lower digit position.
P₃ ..... ACC is loaded with the subtrahend N.
P₄ ..... The complement of the subtrahend to "15" is evaluated and loaded into ACC.
P₅ ..... In the event that any borrow occurs during the subtraction, the complement of the subtrahend to "16" is added to the minuend. If a borrow free state is denoted as C = 1, then a straight binary subtraction of $\overline{ACC} + C + M \rightarrow ACC$ is effected.
P₆ ..... The resulting difference during P₅ is returned to the same memory through the exchange between ACC and that memory.

(Type 5) $M_1 - N \rightarrow M_2$

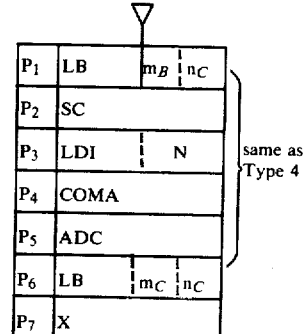

P₆ ..... To load the resulting difference during P₅ into the second memory, the file address $m_C$ and the digit address $n_C$ of the second memory are selected.
P₇ ..... Through exchange the resulting difference is transferred from ACC into the second memory as specified by the step P₆.

(Type 6)

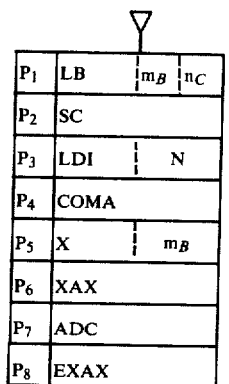

P₁ ..... The file address $m_B$ and the digit address $n_C$ of the memory ready for the step P₅ are selected.
P₂ ..... Subtraction is carried out in the manner of adding the complement of a subtrahend to a minuend and the F/F C remains set because of the absence of a borrow from a lower digit position.
P₃ ..... ACC is loaded with the subtrahend N.
P₄ ..... The complement of the subtrahend to "15" is evaluated and loaded into ACC.
P₅ ..... To accomplish calculations with the contents of the register X, the memory as specified by P₁ is loaded with the contents of ACC.
P₆ ..... The contents of the register X are transmitted into ACC through the exchange process. After this step the memory contains the complement of the subtrahend to "15" and ACC contains the contents of X.
P₇ ..... ACC + M + C corresponds to X − N and the results of a binary subtraction are loaded into ACC.
P₈ ..... The contents of ACC are exchanged with the contents of X and the value of X − N is -continued transmitted into X, thereby completing the
processing of Type 6.

(Type 7) $N - M_1 \rightarrow M_1$

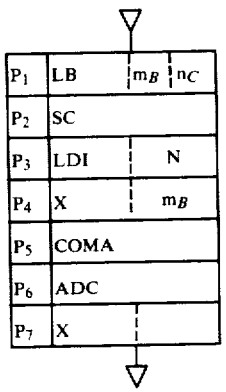

| P₁ | LB | $m_B$ | $n_C$ |
| P₂ | SC | | |
| P₃ | LDI | N | |
| P₄ | X | $m_B$ | |
| P₅ | COMA | | |
| P₆ | ADC | | |
| P₇ | X | | |

P₁ ..... The file address $m_B$ and the digit address $n_C$ of the memory to be processed are selected.

P₂ ..... One-digit subtraction is effected in the manner of adding the complement of a subtrahend to a minuend, in which case F/F C remains set.

P₃ ..... ACC is loaded with a minuend.

P₄ ..... The exchange is effected between the memory (the subtrahend) and ACC and the memory file address remains as $m_B$ for preparation of P₇.

P₅ ..... The complement of a subtrahend in ACC to "15" is evaluated and loaded into ACC.

P₆ ..... In the event that there is no borrow from a lower digit position, the complement of a subtrahend to "16" is added to a minuend. If a borrowless state is denoted as C = 1, then N – M is substantially executed by $\overline{ACC} + C + M$, the resulting difference being loaded into ACC.

P₇ ..... Since the memory file address remains unchanged during P₄, the difference is unloaded from ACC back to the memory, thus completing the proceesing of Type 7.

(Type 8) $N - M_1 \rightarrow M_2$

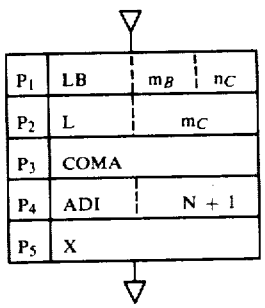

| P₁ | LB | $m_B$ | $n_C$ |
| P₂ | L | $m_C$ | |
| P₃ | COMA | | |
| P₄ | ADI | N + 1 | |
| P₅ | X | | |

P₁ ..... The file address $m_B$ and the digit address $n_C$ of the memory to be processed are selected.

P₂ ..... The contents specified by the step P₁ and corresponding to a subtrahend are loaded into ACC. The file address $m_C$ of the second memory is specified for preparation of a step P₅.

P₃ ..... The complement of the subtrahend to "15" is evaluated and loaded into ACC.

P₄ ..... The operand is made a minuend plug "1". This subtraction is one digit long and accomplished by adding the complement of the subtrahend to the minuend. A conventional complementary addition is defined as $\overline{ACC} + C + M$ as in the Type 7 processing in the absence of a borrow as defined by C = 1. Since the ADI instruction carries C, $\overline{ACC}$ + 1 is processed in advance. This completes the processing of Type 8 of N – M, the results being stored within ACC.

P₅ ..... The difference obtained from the step P₄ is transmitted into the second memory specified by P₂.

(Type 9) $M \pm 1 \rightarrow M$

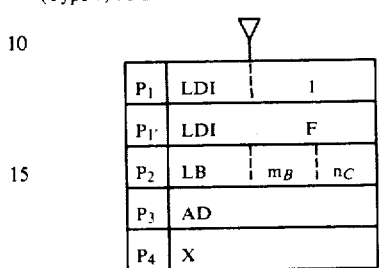

| P₁ | LDI | 1 | |
| P₁' | LDI | F | |
| P₂ | LB | $m_B$ | $n_C$ |
| P₃ | AD | | |
| P₄ | X | | |

P₁ ..... (When M + 1) ACC is loaded with a binary number "0001" (=1).

P₁' ..... (When M – 1) ACC is loaded with a binary number "1111" (=15).

P₂ ..... The file address $m_B$ and the digit address $n_C$ of the memory to be processed are selected.

P₃ ..... The contents of the memory specified by P₂ are added to the contents contained within ACC during P₁ or P₁', the sum thereof being loaded into ACC. In the case of P₁ ACC + 1 and in the case of P₁' ACC – 1.

P₄ ..... The results are unloaded from ACC to the original memory position, thus completing the processing fashion of Type 9.

(VI) PROCEDURE OF EFFECTING A DECIMAL ADDITION OR SUBTRACTION BETWEEN A SPECIFIC REGION OF THE MEMORY AND A DIFFERENT REGION (Type 1) $X + W \rightarrow X$

| P₁ | LB | $m_A$ | $n_E$ |
| P₂ | RC | | |
| P₃ | L | $m_B$ | |
| P₄ | ADI | 6 | |
| P₅ | ADCSK | | |
| P₆ | DC | | |
| P₇ | XI | $m_A$ | |
| P₈ | T | P₃ | |

P₁ ..... The first digit position of the first memory to be processed is identified by the file address $m_A$ and the digit address $n_E$.

P₂ ..... The carry F/F C is reset because of a carry from a lower digit position in effecting a first digit addition.

P₃ ..... The contents of the specific digit position of the first memory are loaded into ACC and the file address $m_B$ of the second memory is selected in advance of additions with the contents of the second memory during P₄.

P₄ ..... "6" is added to the contents of the specific digit position of the first memory now loaded into ACC for the next succeeding step P₅ wherein a decimal carry is sensed during addition.

P₅ ..... ACC already receives the contents of the

-continued first memory compensated with "6" and a straight binary addition is effected upon the contents of ACC and the contents of the second memory at the corresponding digit positions, the results being loaded back to ACC. In the event a carry is developed during the binary addition at the fourth bit position, $P_7$ is reached without passing $P_6$. The presence of the carry during the fourth bit addition implies the development of a decimal carry.

$P_6$ ..... In the event the decimal carry failed to develop during the addition $P_5$, "6" for the process $P_4$ is overruded. An addition of "10" is same as a subtraction of "6".

$P_7$ ..... The one-digit decimal sum is unloaded from ACC into the second memory and the digit address is incremented for a next digit addition and the file address $m_A$ of the first memory is selected. The final digit to be added is previously set at $n_1$. Since $BL = n_1$ after the overall digit addition is effected upon the first and second memory, the next succeeding step $P_8$ is skipped to thereby complete the processing of Type 1.

$P_8$ ..... The program address $P_3$ is selected and the instructions $P_3$-$P_7$ are repeatedly executed until $BL = n_1$. A decimal addition is effected digit by digit.

(Type 2) $X - W \rightarrow X$

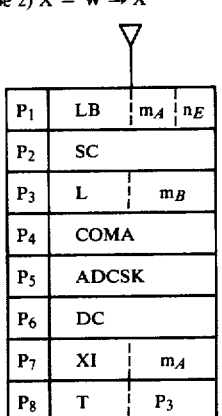

| $P_1$ | LB | $m_A$ | $n_E$ |
| --- | --- | --- | --- |
| $P_2$ | SC | | |
| $P_3$ | L | | $m_B$ |
| $P_4$ | COMA | | |
| $P_5$ | ADCSK | | |
| $P_6$ | DC | | |
| $P_7$ | XI | $m_A$ | |
| $P_8$ | T | $P_3$ | |

$P_1$ ..... The first digit position of the first memory to be processed is specified by the file address $m_A$ and the digit address $n_E$.

$P_2$ ..... Subtraction is performed in the manner of adding the complement of a subtrahend to a minuend and F/F C is set because of the absence of a borrow from a lower digit position during the first digit subtraction.

$P_3$ ..... The contents of the specific digits in the first memory, the subtrahend, are loaded into ACC and the file address $m_B$ of the second memory is specified in advance of the step $P_7$ with the second memory.

$P_4$ ..... The complement of the subtrahend to "15" is evaluated and loaded into ACC.

$P_5$ ..... In the event that there is no borrow from a lower digit place, the complement of the subtrahend is added to the minuend to perform a subtraction. On the contrary, in the presence of a borrow, the complement of the subtrahend is added to the minuend. If a borrowless state is denoted as $C = 1$, then a binary addition of $\overline{ACC} + C + M \rightarrow ACC$ is effected. The development of a carry, as a consequence of the execution of the ADSCK instruction, implies failure to give rise to a borrow and leads to the step $P_7$ without the intervention of the step $P_6$. Under these circumstances the addition is executed with the secondary memory, thus executing substantially subtraction between the first and second memories.

$P_6$ ..... In the case where no carry is developed during the execution of the ADCSK instruction by the step $P_5$, the calculation results are of the sexadecimal notation and thus converted into a decimal code by subtraction of "6" (equal to addition of "10").

$P_7$ ..... The resulting difference between the first and second memories is transmitted from ACC into the second memory. The digit address is incremented and the file address $m_A$ of the first memory is specified in advance of a next succeeding digit subtraction. The final digit to be subtracted is previously determined as $n_1$. Since $BL = n_1$ after the overall-digit subtraction has been completed, the next step $P_8$ is skipped to thereby conclude the processing of Type 2.

$P_8$ ..... After selection of the program address $P_3$ the instructions $P_3$-$P_7$ are repeatedly executed until $BL = n_1$. The decimal subtraction is advanced digit by digit.

(VII) PROCEDURE OF SHIFTING ONE DIGIT THE CONTENTS OF A SPECIFIC REGION OF THE MEMORY (Type 1) Right Shift

| $P_1$ | LB | $m_A$ | $n_A$ |
| --- | --- | --- | --- |
| $P_2$ | LDI | | 0 |
| $P_3$ | XD | | $m_A$ |
| $P_4$ | T | | $P_3$ |

$P_1$ ..... The file address $m_A$ and the digit address $n_A$ of the memory to be processed are determined.

$P_2$ ..... ACC is loaded with "0" and ready to introduce "0" into the most significant digit position when the right shift operation is effected.

$P_3$ ..... The exchange is carried out between XCC and the memory and the digit address is decremented to specific a one digit lower position. The memory address is still at $m_A$. XD is repeated executed through $P_4$ and $P_3$.

By the step ACC $\leftrightarrow$ M "0" is transmitted from ACC to the most significant digit position of the memory which in turn provides its original contents for ACC. When the digit address is down via B and XD is about to be executed at $P_3$ via $P_4$, the second most significant digit is selected to contain the original content of the most significant digit position which has previously been contained within ACC. At this time ACC is allowed to contain the contents of the second most significant digit position. The least significant digit is previously selected as $n_2$. If the transmission step reaches the least significant digit position $BL = n_2$ is satisfied and $P_4$ is skipped. In other words, the digit contents are shifted down to thereby conclude the processing of Type 1.

$P_4$ ..... XD is repeated at $P_3$ until $BL = V$.

(Type 2) Left Shift

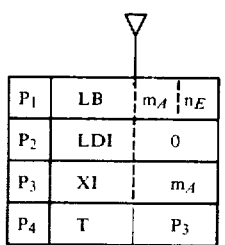

P₁ ..... The file address $m_A$ and the least significant digit $n_E$ of the memory to be processed are determined.

P₂ ..... ACC is loaded with "0" and ready to introduce "0" into the least significant digit position when the left shift operation is started.

P₃ ..... The exchange is carried out between ACC and the memory and the digit address is incremented to specify a one digit upper position. The memory address is still at $m_A$. XD is repeated excuted through P₄ and P₃. By the step ACC → M, "0" is transmitted from ACC to the least significant digit position of the memory which in turn provides its original contents for ACC. When the digit address is up via P₃ and XD is about to be executed at P₃ via P₄, the second least significant digit is selected to contain the original content of the least significant digit position which has previously been contained within ACC. At this time ACC is allowed to contain the contents of the second least significant digit position. The most significant digit is previously selected as $n_1$. If the transmission step reaches the most significant digit position, BL = $n_1$ is satisfied and P₄ is skipped. In other words, the digit contents are shifted up to thereby conclude the processing of Type 2.

P₄ ..... XI is repeated at P₃ until BL = V.

(VIII) PROCEDURE OF SETTING OR RESETTING A ONE-BIT CONDITION F/F ASSOCIATED WITH A SPECIFIC REGION OF THE MEMORY (Type 1)

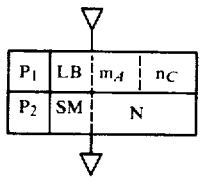

P₁ ..... The file address $m_B$ and the digit address $n_C$ of a region of the memory to be processed are determined.

P₂ ..... "1" is loaded into a desired bit N within the digit position of the memory specified by P₁, thus concluding the processing of Type 1.

(Type 2)

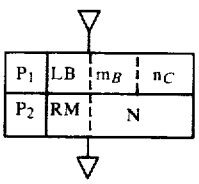

P₁ ..... The file address $m_B$ and the digit address $n_C$ of a region of the memory to be processed are determined.

P₂ ..... "0" is loaded into a desired bit N within the digit position of the memory specified by P₁, thus concluding the processing of Type 2.

(IX) PROCEDURE OF SENSING THE STATE OF THE ONE-BIT CONDITIONAL F/F ASSOCIATED WITH A SPECIFIC REGION OF THE MEMORY AND CHANGING A NEXT PROGRAM ADDRESS (STEP) AS A RESULT OF THE SENSING OPERATION

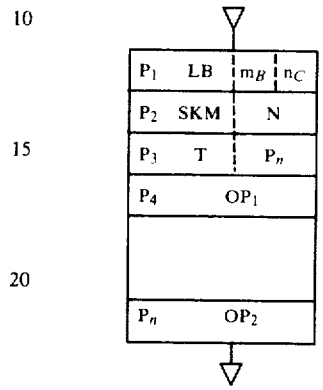

P₁ ..... There are specified the file address $m_B$ and the digit address $n_C$ where a desired one-bit conditional F/F is present.

P₂ ..... In the case where the contents of the bit position (corresponding to the conditional F/F) specified by N within the memory region as selected during P₁ assume "1", the step proceeds to P₄ with skipping P₃, thus executing the operation OP₁. In the event that the desired bit position bears "0", the next step P₃ is skipped.

P₃ ..... When the foregoing P₂ has been concluded as the conditional F/F in the "0" state, the program step $P_n$ is selected in order to execute the operation OP₂.

(X) PROCEDURE OF DECIDING WHETHER THE DIGIT CONTENTS OF A SPECIFIC REGION OF THE MEMORY REACH A PRESELECTED NUMERAL AND ALTERING A NEXT PROGRAM ADDRESS (STEP) ACCORDING TO THE RESULTS OF THE DECISION

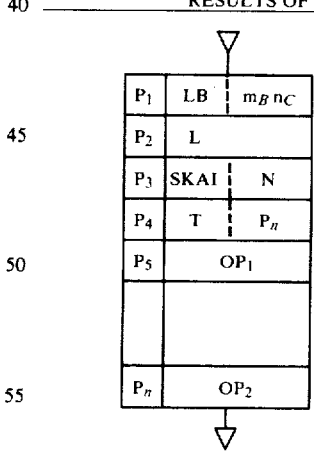

P₁ ..... The region of the memory which contains contents to be decided is identified by the file address $m_B$ and the digit address $n_C$.

P₂ ..... The contents of the memory as identified during P₁ are unloaded into ACC.

P₃ ..... The contents of ACC are compared with the preselected value N and if there is agreement the step advances toward P₅ without executing P₄ to perform the operation OP₁. P₄ is however reached if the contents of ACC are not equal to N.

P₄ ..... The program address (step) $P_n$ is then selected to perform the operation OP₂.

(XI) PROCEDURE OF DECIDING WHETHER THE PLURAL DIGIT CONTENTS OF A SPECIFIC REGION OF THE MEMORY ARE EQUAL TO A PRESELECTED NUMERAL AND ALTERING A PROGRAM STEP ACCORDING TO THE RESULTS OF THE DECISION

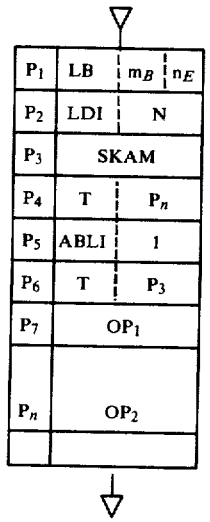

P₁ ..... The region of the memory to be judged is identified by the file address $m_B$ and the first digit address $n_E$.

P₂ ..... The value N is loaded into ACC for comparison.

P₃ ..... The value V within ACC is compared with the digit contents of the specific region of the memory and if there is agreement P₅ is reached without passing P₄ to advance the comparison operation toward the next succeeding digit. P₄ is selected in a non-agreement.

P₄ ..... In the case of a non-agreement during P₃ the program address (step) $P_n$ is specified to execute the operation forthwith.

P₅ ..... The digit address is incremented by adding "1" thereto. This step is aimed at evaluating in sequence a plurality of digits within the memory. The ultimate digit to be evaluated is previously determined as (V). The comparison is repeated throughout the desired digit positions. If a non-agreement state occurs on the way, the operation OP₂ is accomplished through P₄. In the case where the agreement state goes on till BL = V, there is selected P₇ rather than P₆ to perform the operation OP₁.

P₆ ..... When the agreement state goes on during P₅, P₃ is reverted for evaluation.

(XII) PROCEDURE OF DECIDING WHETHER THE CONTENTS OF A SPECIFIC REGION OF THE MEMORY ARE SMALLER THAN A GIVEN VALUE AND DECIDING WHICH ADDRESS (STEP) IS TO BE EXECUTED

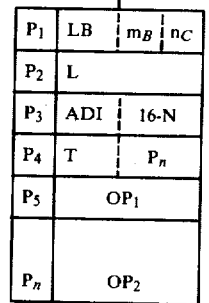

P₁ ..... The file address $m_B$ and the digit address $n_C$ of the memory are decided.

P₂ ..... The contents of the memory as specified during P₁ are unloaded into ACC.

P₃ ..... N is the value to be compared with the contents of the memory and the operand area specifies 16 − N which in turn is added to the contents of ACC, the sum thereof being loaded back to ACC. The occurrence of a fourth bit carry during the addition suggests that the result of the binary addition exceeds 16, that is, M + (16 − N) ≧ 16 and hence M ≧ N. The step is progressed toward P₄.

P₄ ..... When M ≧ N is denied, the program step $P_n$ is selected to carry out the operation OP₂.

(XIII) PROCEDURE OF DECIDING WHETHER THE CONTENTS OF A SPECIFIC REGION OF THE MEMORY ARE GREATER THAN A GIVEN VALUE AND DECIDING WHICH ADDRESS (STEP) IS TO BE EXECUTED

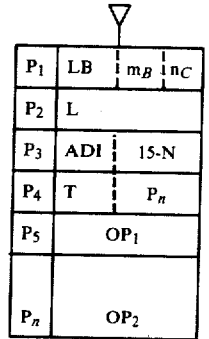

P₁ ..... The file address $m_B$ and the digit address $n_C$ of the memory are decided.

P₂ ..... The contents of the memory as specified during P₁ are unloaded into ACC.

P₃ ..... N is the value to be compared with the contents of the memory and the operand area specifies 15 − N which in turn is added to the contents of ACC, the sum thereof being loaded back to ACC. The occurrence of a fourth bit carry during the addition suggests that the results of binary addition exceeds 16, that is, M + (15 − N) ≧ 16 and hence M ≧ N + 1 and M > N. The step is progressed toward P₅ with skipping P₄, thus performing the operation OP₁. In the absence of a carry (namely, M > N) the step P₄ is reached.

P₄ ..... When M ≧ N is denied, the program address (Step) $P_n$ is selected to carry out the operation OP₂.

(XIV) PROCEDURE OF DISPLAYING THE CONTENTS OF A SPECIFIC REGION OF THE MEMORY (Type 1)

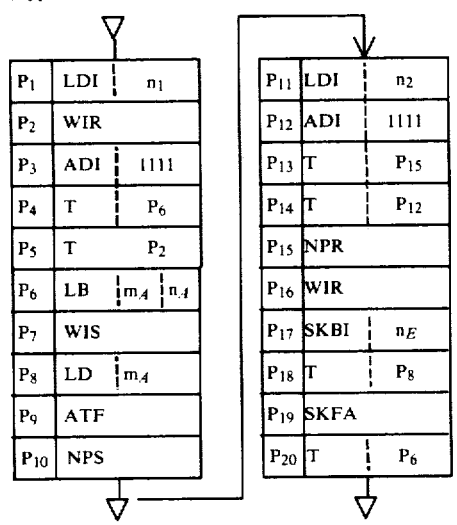

| | | |
|---|---|---|
| $P_1$ | LDI | $n_1$ |
| $P_2$ | WIR | |
| $P_3$ | ADI | 1111 |
| $P_4$ | T | $P_6$ |
| $P_5$ | T | $P_2$ |
| $P_6$ | LB | $m_A$ ⁞ $n_A$ |
| $P_7$ | WIS | |
| $P_8$ | LD | $m_A$ |
| $P_9$ | ATF | |
| $P_{10}$ | NPS | |

| | | |
|---|---|---|
| $P_{11}$ | LDI | $n_2$ |
| $P_{12}$ | ADI | 1111 |
| $P_{13}$ | T | $P_{15}$ |
| $P_{14}$ | T | $P_{12}$ |
| $P_{15}$ | NPR | |
| $P_{16}$ | WIR | |
| $P_{17}$ | SKBI | $n_E$ |
| $P_{18}$ | T | $P_8$ |
| $P_{19}$ | SKFA | |
| $P_{20}$ | T | $P_6$ |

$P_1$ ..... The bit number $n_1$ of the buffer register W is loaded into ACC to reset the overall contents of the buffer register W for generating digit selection signals effective to drive a display panel on a time sharing basis.

$P_2$ ..... After the overall contents of the register W are one bit shifted to the right, its first bit is loaded with "0". This procedure is repeated via $P_4$ until $C_4 = 1$ during $P_3$, thus resetting the overall contents of W.

$P_3$ ..... The operand $I_4$ is decided as "1111" and AC + 1111 is effected (this substantially corresponds to ACC-1). Since ACC is loaded with $n_1$ during $P_1$, this process is repeated $n_1$ times. When the addition of "1111" is effected following ACC = 0, the fourth bit carry $C_4$ assumes "0". When this occurs, the step is advanced to $P_4$. Otherwise the step is skipped up to $P_5$.

$P_4$ ..... When the fourth bit carry $C_4 = 0$ during ACC + 1111, the overall contents of W are reduced to "0" to thereby complete all the pre-display processes. The first address $P_6$ is set for the memory display steps.

$P_5$ ..... In the event that the fourth bit carry $C_4 = 1$ during ACC + 1111, the overall contents of W have not yet reduced to "0". Under these circumstances $P_2$ is reverted to repeat the introduction of "0" into W.

$P_6$ ..... The first digit position of the memory region which contains data to be displayed is identified by the file address $m_A$ and the digit address $n_A$.

$P_7$ ..... After the contents of the register W for generating the digit selection signals are one bit shifted to the right, its first bit position is loaded with "1" and thus ready to supply the digit selection signal to the first digit position of the display.

$P_8$ ..... The contents of the specific region of the memory are unloaded into ACC. The file address of the memory still remains at $m_A$, whereas the digit address is decremented for the next succeeding digit processing.

$P_9$ ..... The contents of the memory is shifted from ACC to the buffer register F. The contents of the register F are supplied to the segment decoder SD to generate segment display signals.

$P_{10}$ ..... To lead out the contents of the register W as display signals, the conditional F/F $N_p$ is supplied with "1" and placed into the set state. As a result of this, the contents of the memory processed during $P_9$ are displayed on the first digit position of the display.

$P_{11}$ ..... A count initial value $n_2$ is loaded into ACC to determine a one digit long display period of time.

$P_{12}$ ..... ACC-1 is carried out like $P_3$. When ACC does not assume "0" (when $C_4 = 1$) the step is skipped up to $P_{14}$.

$P_{13}$ ..... A desired period of display is determined by counting the contents of ACC during $P_{12}$. After the completion of the counting $P_{15}$ is reached from $P_{13}$. The counting period is equal in length to a one-digit display period of time.

$P_{14}$ ..... Before the passage of the desired period of display the step is progressed from $P_{12}$ to $P_{14}$ with skipping $P_{13}$ and jumped back to $P_{12}$. This procedure is repeated.

$P_{15}$ ..... $N_p$ is reset to stop supplying the digit selection signals to the display. Until $N_p$ is set again during $P_{10}$, overlapping display problems are avoided by using the adjacent digit signals.

$P_{16}$ ..... The register W is one bit shifted to the right and its first bit position is loaded with "0". "1" introduced during $P_7$ is one bit shifted down for preparation of the next succeeding digit selection.

$P_{17}$ ..... It is decided whether the ultimate digit of the memory to be displayed has been processed and actually whether the value $n_E$ of the last second digit has been reached because the step $P_8$ of $B_L - 1$ is in effect.

$P_{18}$ ..... In the event that ultimate digit has not yet been reached, $P_8$ is reverted for the next succeeding digit display processing.

$P_{19}$ ..... For example, provided that the completion of the display operation is conditional by the flag F/F FA, FA = 1 allows $P_{20}$ to be skipped, thereby concluding all the displaying steps.

$P_{20}$ ..... If FA = 1 at $P_{19}$, the display steps are reopened from the first display and the step is jumped up to $P_6$.

(Type 2)

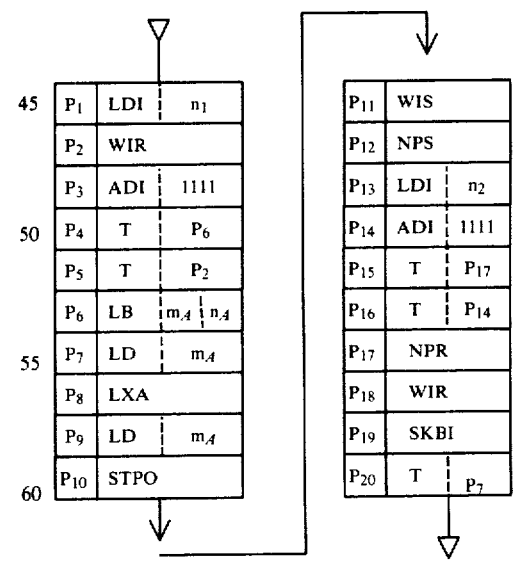

| | | |
|---|---|---|
| $P_1$ | LDI | $n_1$ |
| $P_2$ | WIR | |
| $P_3$ | ADI | 1111 |
| $P_4$ | T | $P_6$ |
| $P_5$ | T | $P_2$ |
| $P_6$ | LB | $m_A$ ⁞ $n_A$ |
| $P_7$ | LD | $m_A$ |
| $P_8$ | LXA | |
| $P_9$ | LD | $m_A$ |
| $P_{10}$ | STPO | |

| | | |
|---|---|---|
| $P_{11}$ | WIS | |
| $P_{12}$ | NPS | |
| $P_{13}$ | LDI | $n_2$ |
| $P_{14}$ | ADI | 1111 |
| $P_{15}$ | T | $P_{17}$ |
| $P_{16}$ | T | $P_{14}$ |
| $P_{17}$ | NPR | |
| $P_{18}$ | WIR | |
| $P_{19}$ | SKBI | |
| $P_{20}$ | T | $P_7$ |

$P_1$ ..... The bit number $n_1$ of the buffer register W is loaded into ACC to reset the overall contents of the buffer register W for generating digit selection signals effective to drive a display panel on a time sharing basis.

$P_2$ ..... After the overall contents of the register

| | |
|---|---|
| | W are one bit shifted to the right, its first bit is loaded with "0". This procedure is repeated via $P_4$ until $C_4 = 1$ during $P_3$, thus resetting the overall contents of W. |
| $P_3$ ..... | The operand $I_A$ is decided as "1111" and AC + 1111 is effected (this substantially corresponds to ACC-1). Since ACC is loaded with $n_1$ during $P_1$, this process is repeated $n_1$ times. When the addition of "1111" is effected following ACC = 0, the fourth bit carry $C_4$ assumes "0". When this occurs, the step is advanced to $P_4$. Otherwise the step is skipped up to $P_5$. |
| $P_4$ ..... | When the fourth bit carry $C_4 = 0$ during ACC + 1111, the overall contents of W are reduced to "0" to thereby complete all the pre-display processes. The first address $P_6$ is set for the memory display steps. |
| $P_5$ ..... | In the event that the fourth bit carry $C_4 = 1$ during ACC + 1111, the overall contents of W have not yet reduced to "0". Under these circumstances $P_2$ is reverted to repeat the introduction of "0" into W. |
| $P_6$ ..... | The upper four bits of the first digit position of the memory region which contains data to be displayed are identified by the file address $m_A$ and the digit address $m_A$. |
| $P_7$ ..... | The contents of the specific region of the memory are unloaded into ACC. The file address of the memory still remains at $m_A$, whereas the digit address is decremented to specify the lower four bits. |
| $P_8$ ..... | The contents of ACC, the upper four bits, are transmitted into the temporary register X. |
| $P_9$ ..... | The contents of the specific region of the memory are unloaded into ACC. The file address of the memory still remains at $m_A$, whereas the digit address is decremented to specify the upper four bits of the next succeeding digit. |
| $P_{10}$ ..... | The contents of ACC are unloaded into the stack register SA and the contents of the temporary register X into the stack register SX. |
| $P_{11}$ ..... | After the contents of the register W for generating the digit selection signals are one bit shifted to the right, its first bit position is loaded with "1" and thus ready to supply the digit selection signal to the first digit position of the display. |
| $P_{12}$ ..... | To lead out the contents of the register W as display signals, the conditional F/F $N_p$ is supplied with "1" and placed into the set state. As a result of this, the contents of the memory processed during $P_{10}$ are displayed on the first digit position of the display. |
| $P_{13}$ ..... | A count initial value $n_2$ is loaded into ACC to determine a one digit long display period of time. |
| $P_{14}$ ..... | ACC − 1 is carried out like $P_3$. When ACC assumes "0" $P_{15}$ is reached and when ACC ≠ 0 (when $C_4 = 1$) the step is skipped up to $P_{16}$. This procedure is repeated. |
| $P_{15}$ ..... | A desired period of display is determined by counting the contents of ACC during $P_{14}$. After the completion of the counting $P_{17}$ is reached from $P_{15}$. The counting period is equal in length to a one-digit display period of time. |
| $P_{16}$ ..... | Before the passage of the desired period of display the step is progressed from $P_{14}$ to $P_{16}$ with skipping $P_{15}$ and jumped back to $P_{14}$. This procedure is repeated. |
| $P_{17}$ ..... | $N_p$ is reset to stop supplying the digit selection signals to the display. Until $N_p$ is set again during $P_{10}$, overlapping display problems are avoided by using the adjacent digit signals. |
| $P_{18}$ ..... | The register W is one bit shifted to the right and its first bit position is loaded with "0". "1" introduced during $P_7$ is one bit shifted down for preparation of the next succeeding digit selection. |
| $P_{19}$ ..... | It is decided whether the ultimate digit of the memory to be displayed has been processed and actually whether the value $n_E$ of the last second digit has been reached because the step $p_9$ of $B_L − 1$ is in effect. |
| $P_{20}$ ..... | In the event that ultimate digit has not yet been reached, $P_7$ is reverted for the next succeeding digit display processing. |

(XV) PROCEDURE OF DECIDING WHICH KEY SWITCH IS ACTUATED (SENSING ACTUATION OF ANY KEY DURING DISPLAY)

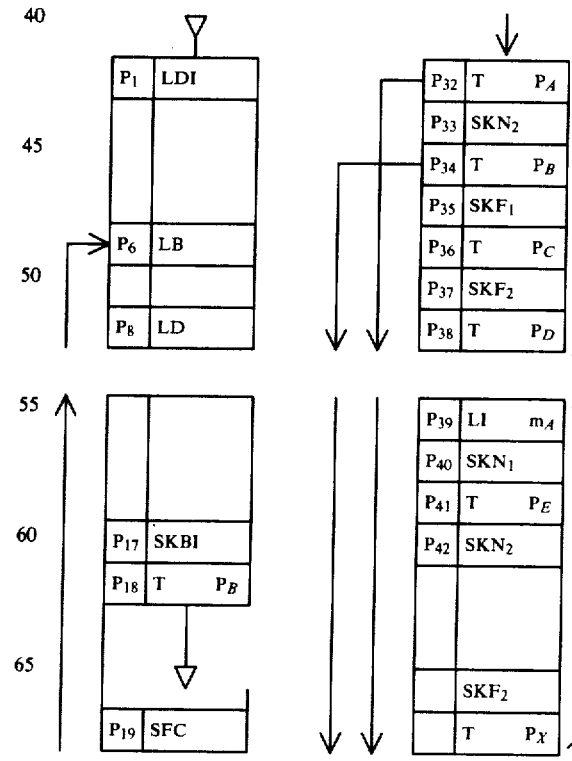

-continued

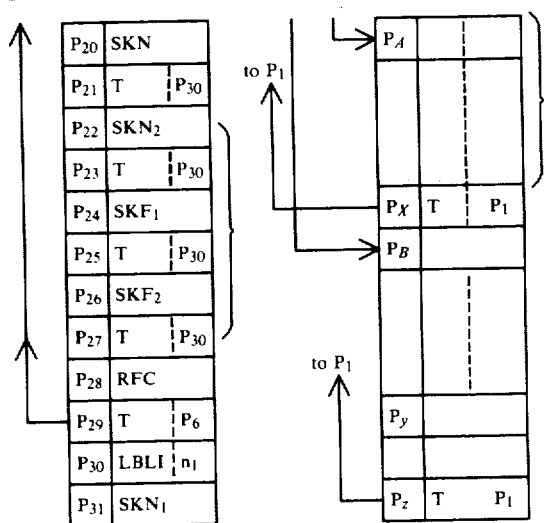

| | | |
|---|---|---|
| $P_{20}$ | SKN | |
| $P_{21}$ | T | $P_{30}$ |
| $P_{22}$ | SKN$_2$ | |
| $P_{23}$ | T | $P_{30}$ |
| $P_{24}$ | SKF$_1$ | |
| $P_{25}$ | T | $P_{30}$ |
| $P_{26}$ | SKF$_2$ | |
| $P_{27}$ | T | $P_{30}$ |
| $P_{28}$ | RFC | |
| $P_{29}$ | T | $P_6$ |
| $P_{30}$ | LBLI | n$_1$ |
| $P_{31}$ | SKN$_1$ | | to $P_{32}$ $P_1$–$P_{18}$ .. The display processes as discussed in (XIV) above.

$P_{19}$ ..... After the overall digit contents of the register W are displayed, the flag F/F FC is set to hold all the key signals $I_1$–$I_n$ at a "1" level.

$P_{20}$ ..... The step is jumped to $P_{30}$ as long as any one of the keys connected to the key input KN$_1$ is actuated.

$P_{22}$–$P_{27}$ .. It is decided whether any one of the keys each connected to the respective key inputs KN$_2$–KF$_2$ and in the absence of any actuation the step is advanced toward the next succeeding step. To the contrary, the presence of the key actuation leads to $P_{30}$.

$P_{28}$ ..... When any key is not actuated, F/F FC is reset to thereby complete the decision as to the key actuations.

$P_{29}$ ..... The step is jumped up to $P_6$ to reopen the display routine.

$P_{30}$ ..... When any key is actually actuated, the memory digit address is set at n$_1$ to generate the first key strobe signal $I_1$.

$P_{31}$ ..... It is decided if the first key strobe signal $I_1$ is applied to the key input KN$_1$ and if not the step is advanced toward $P_{33}$.

$P_{32}$ ..... When the first key strobe signal $I_1$ is applied to the key input KN$_1$, which kind of the keys is actuated is decided. Thereafter, the step is jumped to $P_A$ to provide proper controls according to the key decision. After the completion of the key decision the step is returned directly to $P_1$ to commence the displaying operation again ($P_Z$ is to jump the step to $P_1$)

$P_{33}$–$P_{38}$ ..... It is sequentially decided whether the keys coupled with the first key strobe signal $I_1$ are actuated. If a specific key is actuated, the step jumps to $P_B$–$P_D$ for providing appropriate controls for that keys.

$P_{39}$ ..... This step is executed when no key coupled with the first key strobe signal $I_1$. This step is to increment the digit address of the memory for the developments of the key strobe signals.

$P_{41}$ and up ..... The appropriate key strobe signals are developed and KN$_1$–KF$_2$ are sequentially monitored to decide what kind of the keys are actuated. Desired steps are then selected to effects control steps for those actuated keys.

$P_A$ and up ..... Control steps for the first actua-

-continued ted keys.

$P_X$ ..... $P_1$ is returned to reopen the display operation after the control steps for the first key.

The foregoing is the description of the respective major processing events in the CPU architecture.

By reference to a flow chart of FIG. 6 an example of the display operation of a calculator implementing the display device according to the preset invention will now be described in detail.

Figure 6:
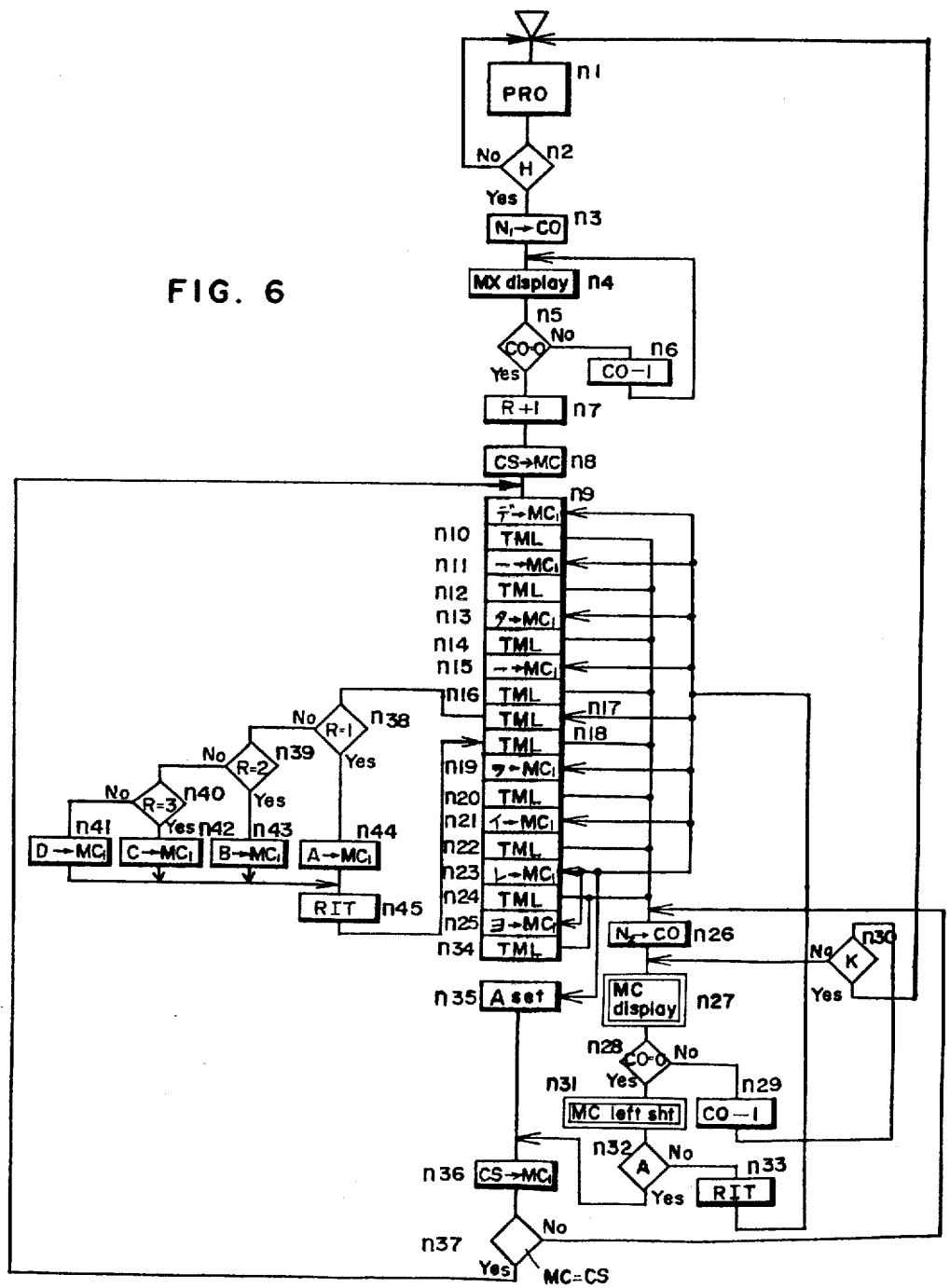
FIG. 6 is a flow chart for explaining the displaying operation according to the present invention.

In FIG. 6, n$_1$ represents the step of executing operations programmed by the operator and n$_2$ the step of checking if the calculator is in a halt. Unless the calculator is in a halt n$_1$⇌n$_2$ are repeated. The halt condition used herein means that a particular calculation comes to a halt until data are entered at the step of entering data from outside of the calculator on the way of executing the particular calculation. If the halt condition is reached, n$_2$→n$_3$ so that a given value N$_1$ is sent to a counter CO which is built in a specific region of RAM. During the step n$_4$ the results MX of calculations (or running results) are displayed. The step n$_5$ is effected to check if the count of the counter CO is "0". If CO≠0, then the step n$_6$ is effected to subtract "1" from the count of the counter CO. In other words, a cycle of the steps n$_4$→n$_5$→n$_6$→n$_4$→n$_5$→is repeated N$_1$+1 times, displaying MX for a given period of time (say, 5 sec). Thereafter, when the count of the counter CO reaches "0", n$_5$→n$_7$ to add "1" to a counter R which is part of RAM.

Assume now that the counter R is reset to "0". R contains the recoveries of the halt condition. During n$_8$ suppress codes CS are loaded into a character memory MC which occupies a specific region of RAM and contains characters each having 8 bit codes. The purpose of the suppress codes CS is to keep the display from displaying anything, for example, encoded as "11111111". During n$_9$ the character generator MC is allowed to contain codes indicative of "DE (τ)" at its first digit position. n$_{10}$ is then executed to load the count of a program counter P$_L$ within ROM plus "1" into the program stack register SP. cf. the instruction code No. 54 which is to specify its home address with the aid of the return RIT instruction No. 55. Then, n$_{10}$→n$_{26}$ to load a given value N$_2$ into the counter CO within RAM. During n$_{27}$ the contents of the character generator MC are displayed. n$_{28}$ follows to check if the count of the counter CO reaches "0" and if CO≠0 the step n$_{29}$ tekes place to subtract "1" from the count of the counter CO. Whether there is any key input applied is decided during n$_{30}$ and in the absence of any key actuation the steps are linked as n$_{30}$→n$_{27}$. In other words, a chained cycle of n$_{27}$→n$_{28}$→n$_{29}$→n$_{30}$→n$_{27}$ and so on is repeated N$_2$+1 times, in which case the displaying operation goes on for a given length of time. After that n$_{28}$→n$_{31}$, thus shifting the visual display of the contents of the character memory MC to the left by the one digit length. The step n$_{32}$ is to determine whether the conditional F/F A (part of RAM) is in the set or reset state. F/F A is set during n$_{35}$ after all data are stored into the character memory MC, thus deciding whether the display of the data (FIGS. 2(b) through 2(f)) has been completed. In this instance, with F/F A in the reset state, n$_{32}$→n$_{33}$ and then step n$_{11}$ is reached through the return (RIT) instruction. The step n$_{11}$ corresponds to the count of the program counter P_L in ROM stored pursuant to the TML instruction at $n_{10}$. In this manner, the visual display indicative of "DE (J")" is completed as viewed from FIG. 2(b) through the steps $n_9 \to n_{10} \to n_{26} \to n_{27} \to n_{28} \to n_{27} \to n_{30} \to n_{27} \to n_{28} \to n_{31} \to n_{32} \to n_{33}$. A sequence of the operating steps $n_{11} \to n_{12} \to n_{26} \to n_{27} \to n_{28} \to n_{29} \to n_{30} \to n_{27} \to n_{28} \to n_{31} \to n_{32} \to n_{33}$ provides a visual display of "DEH (J —)" as shown in FIG. 2(c). Likewise, a sequence of the operating steps of $n_{15} \to n_{16} \to n_{26} \to n_{27} \to n_{28} \to n_{29} \to n_{30} \to n_{27} \to n_{28} \to n_{31} \to n_{32} \to n_{33}$ provides a visual display of "DEHTA (J" )".

Subsequently, the step is advanced from $n_{33}$ to $n_{17}$ to store the step to be returned through the RIT instruction and $n_{17} \to n_{38}$ to monitor the count of the counter R.

When R=1 particularly under the first halt condition at $n_7$, $n_{38} \to n_{44}$ to allow the character memory MC to contain at its first digit position codes indicative of "A". Through the developments of $n_{44} \to n_{45} \to n_{18}$, the step $n_{19}$ to be returned through the return instruction is recalled, followed by the step $n_{26}$. Therefore, a visual display of "DEHTA A (J- A)" is provided through $n_{44} \to n_{45} \to n_{18} \to n_{26} \to n_{27} \to n_{28} \to n_{29} \to n_{30} \to n_{27} \to n_{28} \to n_{31} \to n_{32} \to n_{33}$.

In the foregoing manner, the contents of the character memory are visually displayed while the contents of the character memory are progressively shifted and a new character to be displayed is loaded into its first digit position, as viewed from FIGS. 2(b) through 2(f). After the display is completed as indicated in FIG. 2(f), the step $n_{35}$ becomes operative through the return instruction, in which the conditional F/F A is forced into the set state. During the next step $n_{36}$ the suppress codes CS are contained at the first digit position of the character generator MC, which codes establishes a boundary between different two displaying contents. The step $n_{37}$ is carried out to decide whether the overall digits within the character generator MC assume the suppress codes CS. The decision as to MC=CS is aimed at beginning the display operation with the head of the contents to be displayed after the overall digits are shifted off on the display panel. Since in this case the overall digit assume no suppress codes, $n_{37} \to n_{26}$ to enable a display as shown in FIG. 2(g). Thereafter, the contents of the character memory are shifted during $n_{31}$ and allowed to contain the suppress codes during $n_{36}$. As a result, the displaying contents are gone from the extreme left end of the display panel. Provided that the memory character is filled completely with the suppress codes, $n_{36} \to n_{37} \to n_9$ to repeat the display operation. In other words, "DEHTA A WO IREYO (J"— A λ Ξ and INSERT DATA A in its English version)" is visually repeatedly displayed.

Since the operator has completed the program for the calculation at the step $n_1$ under these circumstances, he then inserts the data A via the keys. The step $n_{30}$ recognizes that there has actually been the key input, returning to the steps $n_1$. The calculation routine is reopened with the step $n_1$ according to the newly keyed data.

Then, if the calculator comes to a halt again, then $n_2$ $n_3$ and the instantaneous calculation results are displayed for a given length of time via the chained steps of $n_4 \to n_5 \to n_6 \to n_4$ in the same way as in the first halt condition. "1" is added to the counter R during $n_7$. In this case R=2. Likewise the first halt condition the same steps are repeated up to $n_{17}$, followed by $n_{38} \to n_{39} \to n_{43}$ in which codes representative of "B" are loaded into the character memory MC during $n_{43}$.

Therefore, "DEHTA B WO IREYO (INSERT DATA B in its English version)" is displayed under the second halt condition. Similarly, "DEHTA C WO IREYO (INSERT DATA C in its English version)" is displayed under the third halt condition and "DEHTA D WO IREYO" under the fourth halt condition.

Figure 7:
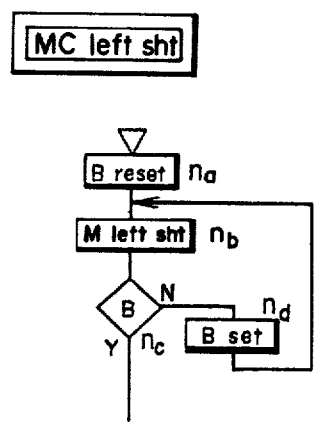
FIG. 7 is a flow chart for explaining the left shift operation of a character memory MC.
Figure 4A:
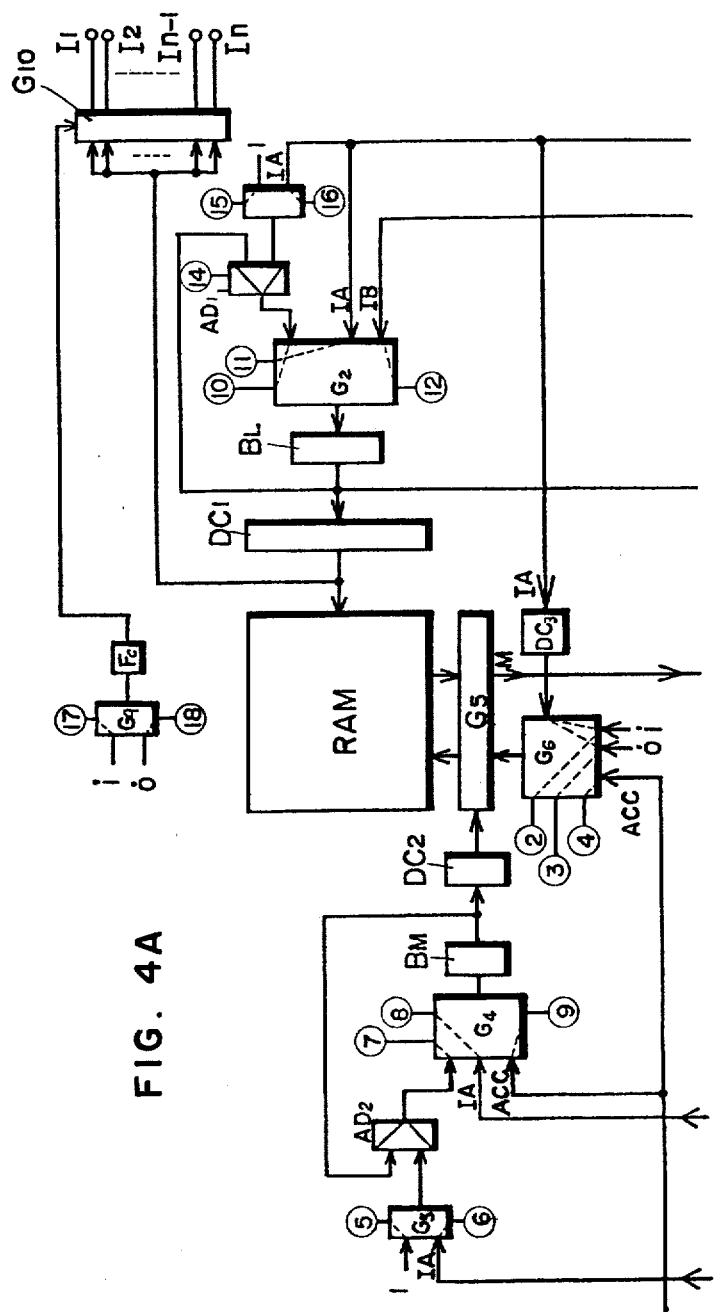
FIGS. 4A, 4B, 4C and 4D are logic diagrams of an example of a central processor unit (CPU) in the calculator.
Figure 4B:
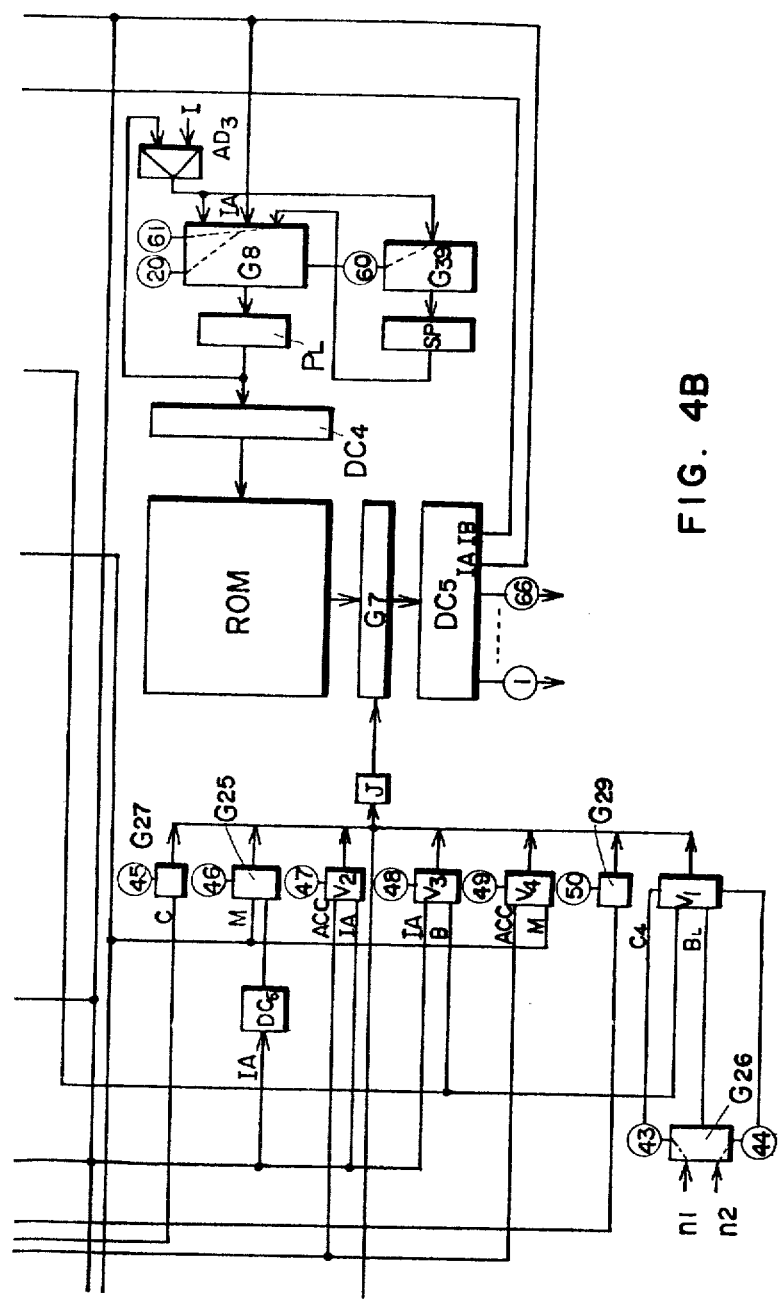
Figure 4C:
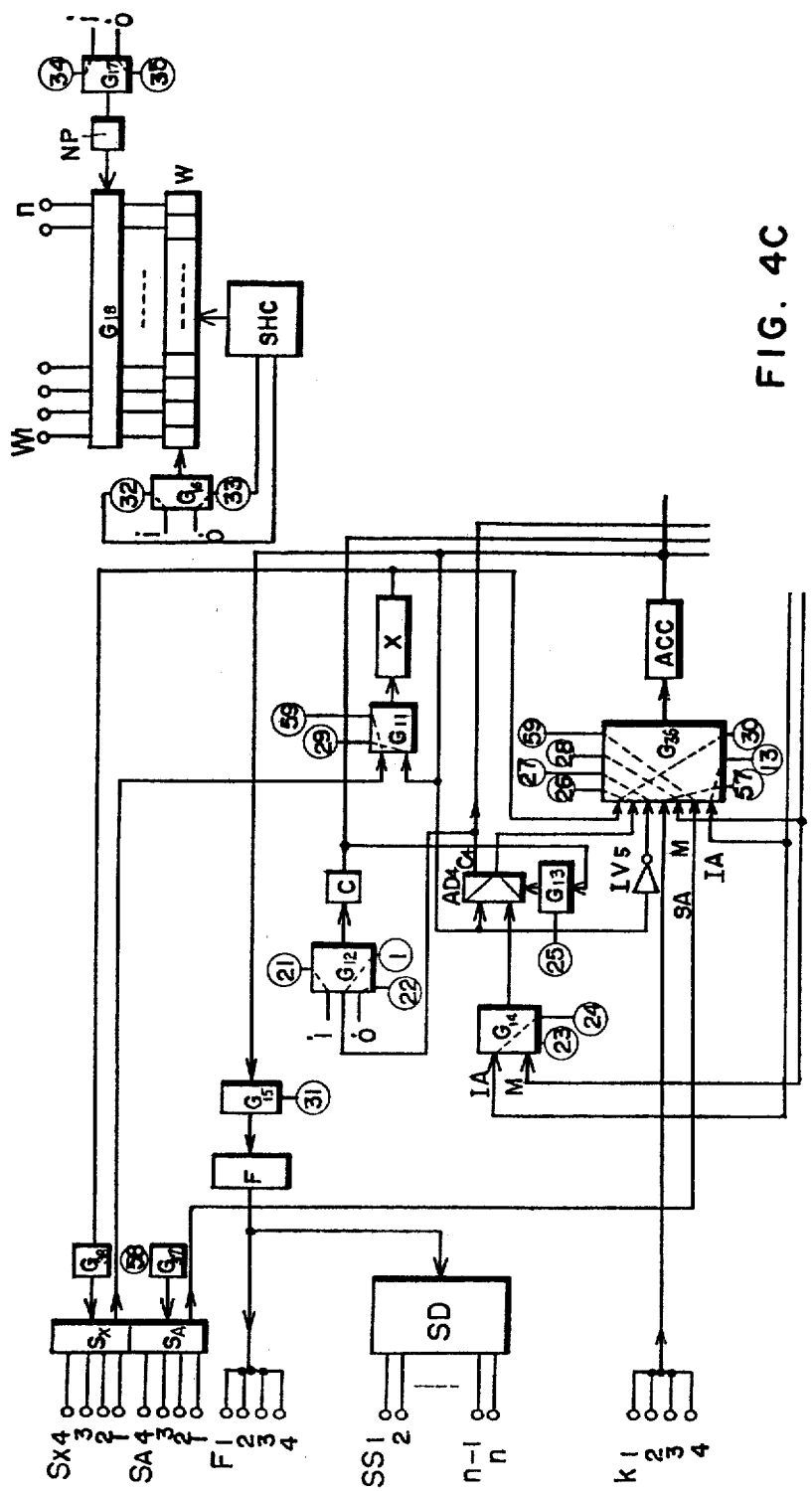
Figure 4D:
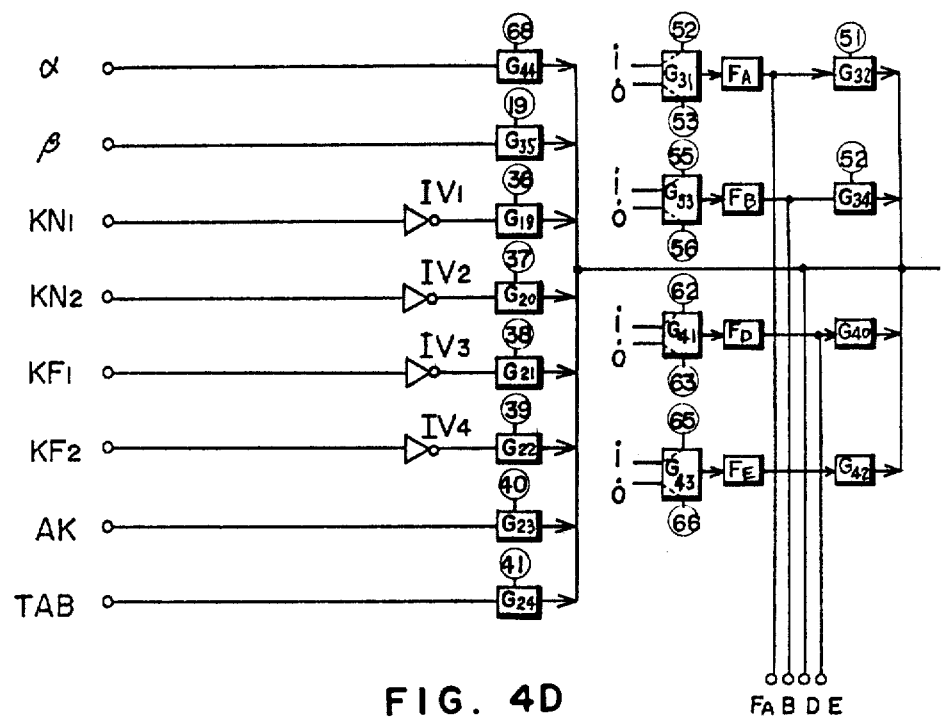

FIG. 7 is a flow chart of a subroutine

MC left shift shown in FIG. 6. The conditional F/F B (part of RAM) is reset during the step $n_a$ and the contents of the character memory MC are 4 bits shifted to the left during the step $n_b$. The step $n_c$ is effected to monitor the state the flip flop B, followed by the step $n_d$ of setting the flip flop B. During the step $n_b$ the character memory MC is shifted 4 bits to the left again. This subroutine ends with the next succeeding monitoring of the flip flop B. Since each of the characters contained within the character memory MC has 8 bits, MC is shifted one character by repeating the 4 bit long shift operation twice.

It is obvious that the respective processing events depicted in FIGS. 6 and 7 can be executed according appropriate subcombinations of the above defined functional operations accomplished by the CPU architecture. Table 3 shows the relationship between the processing events depicted in FIG. 6 and the functional operations accomplished by the CPU architecture. The processing list numbers correspond to the above described functional procedures (I) through (XV).

TABLE 3

| step | processing list No. | step | processing list No. |
|---|---|---|---|
| $n_1$ | | $n_{21}$ | (II) Type 1 |
| $n_2$ | (IX) | $n_{22}$ | |
| $n_3$ | (II) Type 1 | $n_{23}$ | (II) Type 1 |
| $n_4$ | (XIV) Type 1 | $n_{24}$ | |
| $n_5$ | (X) | $n_{25}$ | (II) Type 1 |
| $n_6$ | (V) Type 9 | $n_{26}$ | (II) Type 1 |
| $n_7$ | (V) Type 9 | $n_{27}$ | (XIV) Type 2 |
| $n_8$ | (I) Type 1 | $n_{28}$ | (X) |
| $n_9$ | (II) Type 1 | $n_{29}$ | (V) Type 9 |
| $n_{10}$ | | $n_{30}$ | (XV) |
| $n_{11}$ | (II) Type 1 | $n_{31}$ | FIG. 5 |
| $n_{12}$ | | $n_{32}$ | (IX) |
| $n_{13}$ | (II) Type 1 | $n_{33}$ | |
| $n_{14}$ | | $n_{34}$ | |
| $n_{15}$ | (II) Type 1 | $n_{35}$ | (VIII) Type 1 |
| $n_{16}$ | | $n_{36}$ | (II) Type 1 |
| $n_{17}$ | | $n_{37}$ | (XI) |
| $n_{18}$ | | $n_{38}$ | (X) |
| $n_{19}$ | | $n_{39}$ | (X) |
| $n_{20}$ | | $n_{40}$ | (X) |
| | | $n_{41}$ | (II) Type 1 |
| | | $n_{42}$ | (II) Type 1 |
| | | $n_{43}$ | (II) Type 1 |
| | | $n_{44}$ | (II) Type 1 |
| | | $n_{45}$ | |

As is clear from Table 3, the respective steps in FIG. 6 are accomplished by the functional operations of the CPU architecture. The steps $n_1$, $n_{10}$, $n_{12}$, $n_{14}$, $n_{16}$-$n_{18}$, $n_{20}$, $n_{22}$, $n_{24}$, $n_{33}$ and $n_{34}$ are easily understood from the disclosure of the CPU architecture.

Table 4 depicts the relationship between the respective steps of shifting the character memory MC to the left and the functional operations of the CPU architecture.

TABLE 4

| step | processing list No. |
|---|---|
| $n_a$ | (VIII) Type 2 |
| $n_b$ | (VII) Type 2 |
| $n_c$ | (IX) |
| $n_d$ | (VIII) Type 1 |

Similarly, the MC left shift operation can be accomplished by the respective steps as is clear from Table 4.

As noted earlier, the present invention makes the CPU architecture which interprets and executes the various instructions, available for the displaying purposes in electronic calculators and so forth.

Whereas the present invention has been described with respect to a specific embodiment, it will be understood that various changes and modifications will be suggested to one skilled in the art, and it is intended to encompass such changes and modifications as fall within the scope of the appended claims.

We claim:

1. An electronic calculator comprising:
calculating means for performing arithmetic operations and for producing an output representative of the results of these operations;
prompting means for generating signals representative of operating instructions for instructing the user of procedures used by said calculating means;
a multiple character display;
first means for converting the output of said calculating means into a display signal to statically display the results of said arithmetic operations of said multiple character display; and
second means for converting the signals generated by said prompting means into alphanumeric display signals to generate a running display of said operating instructions on said multiple character display.

2. The calculator of claim 1 wherein said second means for converting allows said display to display instructions having a greater length than the capacity of said display.

3. The calculator of claim 2 wherein said multiple character display includes a plurality of display segments; and
wherein said second means for converting includes a means for repetitively shifting the instructions being displayed across said display by sequentially shifting a display signal from one display segment to an adjacent display segment.

4. The calculator of claim 3 wherein said means for repetitively shifting includes means for circulating the displayed instructions to wrap the portion of the instructions running off one end of the display around to redisplay that portion by shifting that portion back onto the other end of the display after the total operating instruction is displayed.

5. The calculator of claim 4 wherein said second means for converting may also generate a static display of said operating instructions.

6. The calculator of claim 3 wherein each display segment is a dot matrix display.

7. The calculator of claim 3 wherein said means for repetitively shifting is formed by a central processing unit (CPU) having a read only memory and a random access memory.

8. The calculator of claim 3 wherein said second means for converting further includes means for suppressing a portion of said display panel nearest the end from which the instructions run off.

9. The calculator of claim 7 wherein said instructions to be displayed are stored within a portion of said random access memory, the information stored within said memory being shifted to shift the instructions across said display.

10. A processor comprising
data derivation means for producing desired data in response to a user's control, said desired data being processed by said data derivation means to provide an answer to a user generated query;
prompting means for generating signals indicative of operating instructions for instructing the user of procedures used by said data derivation means;
a multiple character display;
first means for converting said desired data from said data derivation means into a display signal to statically display the answer to the user generated query on said multiple character display; and
second means for converting the signals generated by said prompting means into alphanumeric display signals to generate a running display of said operating instructions on said multiple character display.

11. The processor of claim 10 wherein said second means for converting allows said display to display instructions having a greater length than the capacity of said display.

12. The processor of claim 11 wherein said multiple character display includes a plurality of display segments; and
wherein said second means for converting includes a means for repetitively shifting the instructions being displayed across said display by sequentially shifting a display signal from one display segment to an adjacent display segment.

13. The processor of claim 12 wherein said means for repetitively shifting includes means for circulating the displayed instructions to wrap the portion of the instructions running off one end of the display around to redisplay that portion by shifting that portion back onto the other end of the display after the total operating instruction is displayed.

14. The processor of claim 13 wherein said second means for converting may also generate a static display of said operating instructions.

15. The processor of claim 12 wherein each display segment is a dot matrix display.

16. The processor of claim 12 wherein said means for repetitively shifting is formed by a central processing unit (CPU) having a read only memory and a random access.

17. The processor of claim 12 wherein said second means for converting further includes means for suppressing a portion of said display nearest the end from which the instructions run off.

18. The processor of claim 16 wherein said instructions to be displayed are stored within a portion of said random access memory, the information stored within said memory being shifted to shift the instructions across said display.

* * * * *